(12) United States Patent
Harrison

(10) Patent No.: US 10,650,206 B2
(45) Date of Patent: May 12, 2020

(54) TOOL, DEVICE, APPARATUS AND METHOD

(71) Applicant: Sofmat Limited, Brigg, Lincolnshire (GB)

(72) Inventor: Philip James Harrison, Brigg (GB)

(73) Assignee: SOFMAT LTD, Brigg, Lincolnshire (GB)

( * ) Notice: Subject to any disclaimer, the term of this patent is extended or adjusted under 35 U.S.C. 154(b) by 184 days.

(21) Appl. No.: 15/549,596

(22) PCT Filed: Feb. 15, 2016

(86) PCT No.: PCT/GB2016/050370
§ 371 (c)(1),
(2) Date: Aug. 8, 2017

(87) PCT Pub. No.: WO2016/128779
PCT Pub. Date: Aug. 18, 2016

(65) Prior Publication Data
US 2018/0039806 A1 Feb. 8, 2018

(30) Foreign Application Priority Data
Feb. 13, 2015 (GB) .................... 1502500.0

(51) Int. Cl.
*G01B 11/22* (2006.01)
*G06K 19/06* (2006.01)
(Continued)

(52) U.S. Cl.
CPC ............ *G06K 7/1408* (2013.01); *G01B 11/22* (2013.01); *G05B 19/124* (2013.01);
(Continued)

(58) Field of Classification Search
CPC ............ G06K 7/1408; G06K 7/10544; G06K 7/10792; G06K 19/06037; G06K 19/06159; G05B 19/124; G01B 11/22
See application file for complete search history.

(56) References Cited

U.S. PATENT DOCUMENTS 5,527,117 A * 6/1996 Roy .................... B41J 2/285
335/255
8,608,052 B2 * 12/2013 Hensel ............... G06K 7/10732
235/375
(Continued)

FOREIGN PATENT DOCUMENTS

WO    WO 2010/011833 A1    1/2010
WO    WO 2013/192362 A1   12/2013

OTHER PUBLICATIONS

Notification of Transmittal of International Search Report and the Written Opinion of the International Searching Authority, corresponding to International Application No. PCT/GB2016/050370, dated May 18, 2016.

*Primary Examiner* — Thien M Le
*Assistant Examiner* — Asifa Habib
(74) *Attorney, Agent, or Firm* — Myers Bigel, P.A.

(57) ABSTRACT

In one aspect of the invention for which protection is sought there is provided reader apparatus for reading an identification code carried by a surface feature device, the surface feature device having a plurality of respective surface feature portions each provided at respective lateral locations over a lateral surface at one of a plurality of predetermined distances from a lateral reference plane, the apparatus comprising a light source and a light detector, the apparatus being configured to direct light from the light source onto the respective surface feature portions of the surface feature device and to detect by means of the detector light scattered by the respective surface feature portions, the detector being (Continued)

configured to output a detector signal indicative of the intensity of light incident thereon, the apparatus being configured to generate a reader signal responsive to the distance of each of the respective surface feature portions of the surface feature device from the reference plane in dependence on the detector signal.

10 Claims, 14 Drawing Sheets

(51) Int. Cl.
  *G06K 7/10* (2006.01)
  *G06K 7/14* (2006.01)
  *G05B 19/12* (2006.01)
(52) U.S. Cl.
  CPC ..... *G06K 7/10544* (2013.01); *G06K 7/10792* (2013.01); *G06K 19/06037* (2013.01); *G06K 19/06159* (2013.01); *G01B 2210/50* (2013.01); *G05B 2219/23363* (2013.01)

(56) References Cited

U.S. PATENT DOCUMENTS

| | | | |
|---|---|---|---|
| 9,135,543 B2 * | 9/2015 | Lancaster-Larocque | G06K 19/06178 |
| 2012/0067955 A1 | 3/2012 | Rowe | |

* cited by examiner (a)

(b)

TOOL, DEVICE, APPARATUS AND METHOD

RELATED APPLICATIONS

This application is a 35 U.S.C. § 371 national stage application of PCT Application No. PCT/GB2016/050370, filed on Feb. 15, 2016, which claims priority from Great Britain Patent Application No. 1502500.0 filed on Feb. 13, 2015, the contents of which are incorporated herein by reference in their entireties. The above-referenced PCT International Application was published in the English language as International Publication No. WO 2016/128779 A1 on Aug. 18, 2016.

TECHNICAL FIELD

The present invention relates to apparatus and a method for identifying an object. In particular but not exclusively the invention relates to apparatus and a method for identifying an object and verifying the commercial origin of an object

BACKGROUND

It is known to provide identification devices that may be applied to articles, such as barcodes and radio frequency identification (RFID) tags that may be read by a suitable reader in order to identify the object to which the device has been applied. In both cases the presence of the device is typically readily apparent to a user by visual inspection due to it's size.

It is desirable to provide a covert identification device the presence of which is not obvious to a user. Furthermore, it is desirable to provide a device which may be detected in a relatively rapid manner at a point of sale of an object, such as, but not exclusively in a retail establishment, so that articles of a particular commercial origin may be distinguished from articles that are not of the same commercial origin, for example counterfeit objects.

It is an aim of embodiments of the present invention to address one or more disadvantages associated with the prior art.

SUMMARY OF THE INVENTION

Embodiments of the invention may be understood with reference to the appended claims.

Aspects of the present invention provide apparatus, a tool, a device and a method.

In an aspect of the invention for which protection is sought there is provided apparatus for reading an identification code carried by a surface feature device, the surface feature device having a plurality of respective surface feature portions each provided at respective lateral locations over a lateral surface at one of a plurality of predetermined distances from a lateral reference plane, the apparatus comprising a light source and a light detector, the apparatus being configured to direct light from the light source onto the respective surface feature portions of the surface feature device and to detect by means of the detector light scattered by the respective surface feature portions, the detector being configured to output a detector signal indicative of the intensity of light incident thereon, the apparatus being configured to generate a reader signal responsive to the distance of each of the respective surface feature portions of the surface feature device from the reference plane in dependence on the detector signal.

It is to be understood that the surface feature portions may be in the form of recessed surface feature portions. The surface feature portions may be exposed. That is, the surface feature portions may be substantially directly exposed to an external atmosphere such as air. Alternatively the surface feature portions may be coated, for example with a lacquer or other protective coating that is transparent to apparatus for reading the identification code.

The apparatus may comprise a confocal device, the confocal device comprising the light source and light detector and configured to focus the light source onto the surface feature device, the apparatus being configured to scan light from the light source laterally over each of the respective surface feature portions of the surface feature device, wherein the apparatus is further configured to scan the location of a focal point of focussing means of the confocal device in a reciprocating manner along a direction having at least a component substantially normal to the reference plane such that, for each respective surface feature portion of the surface feature device, the intensity of light incident on the detector is measured at a plurality of distances of the focal point from the reference plane as measured along a direction normal to the reference plane, wherein the apparatus is configured to generate the reader signal in dependence on the intensity of light incident on the detector at respective lateral locations of the beam and at respective distances of the focal point from the reference plane.

The apparatus may be configured to identify, in the reader signal, portions of the signal corresponding to surface feature portions of a first type and portions of the signal corresponding to surface feature portions of a second type, the apparatus being configured to calibrate the distance of the portions of the second type from the reference plane by reference at least in part to the portions of the first type.

Thus the surface feature portions of the first type may be configured to enable calibration of the distance of the portions of the second type from the reference plane, and therefore reading of data such as data representing an identification code, that is represented by the portions of the second type. It is to be understood that the portions of the first type may also store a code, optionally a fixed code for a given batch or type of product such as a GTIN code. The portions of the second type may encode a serial code for a product of a given type or a unique serial code for each of a plurality of respective examples of a product of a given type.

The apparatus may be configured to calibrate the distance of the surface feature portions of the second type from the reference plane by reference at least in part to the relative heights of the surface feature portions of the first and second types and/or by reference at least in part to the distance of the surface feature portions of the first type from the reference plane.

Optionally, the surface feature portions of the first type may define the reference plane, i.e. the surface feature portions of the first type may lie on the reference plane. Thus the reference plane may be below a major surface of the identification device.

The apparatus may be configured to scan light from the light source laterally over each of the respective surface feature portions of the surface feature device by performing a line scan along a row of surface feature portions.

The apparatus may be configured to scan light from the light source laterally over each of the respective surface feature portions of the surface feature device by performing a line scan along each of a plurality of respective rows of surface feature portions.

The apparatus may be configured to determine whether data associated with a reader signal generated by the apparatus is stored in a database and to provide a signal indicative of whether data associated with the reader signal is stored in the database.

The apparatus may be configured to retrieve data associated with the reader signal that is stored in the database.

The apparatus may be configured to determine whether data associated with a reader signal generated by the apparatus is stored in a database and to retrieve data from the database that is associated with the reader signal in dependence on the determination.

The apparatus may be configured to provide an audible and/or visual output indicative of whether data associated with a reader signal generated by the apparatus is stored in a database.

The apparatus may be configured to determine whether the reader signal has one or more predetermined characteristics.

The apparatus may comprise an interferometer device, the interferometer device comprising the light source and light detector.

Optionally the interferometer device is a laser interferometer device.

The apparatus may comprise focussing means configured to cause light from the light source to be brought to a focus at at least one predetermined distance from the focussing means.

Optionally, the apparatus is in the form of portable apparatus configured to be placed in contact with an identification device to read the device.

The apparatus may comprise spacer means configured to space the apparatus a predetermined distance from the device when placed in contact with the device.

The apparatus may comprise a housing, the housing comprising the spacer means.

In a further aspect of the invention for which protection is sought there is provided a method of reading by means of reader apparatus data associated with an identification device in the form of a surface feature device, the surface feature device having a plurality of respective surface feature portions each provided at respective lateral locations over a lateral surface at one of a plurality of predetermined distances from a lateral reference plane, the method comprising directing light from a light source onto the respective surface feature portions of the surface feature device and detecting by means of a detector light scattered by the respective surface feature portions, the method comprising outputting a detector signal indicative of the intensity of light incident thereon, the method further comprising generating a reader signal responsive to the distance of each of the respective surface feature portions of the surface feature device from the reference plane in dependence on the detector signal.

The surface feature portions may be exposed free surfaces provided below a major surface of the device.

Optionally, directing light from the light source onto the respective surface feature portions of the surface feature device and detecting by means of the detector light scattered by the respective portions of the surface feature device comprises:

directing light onto a surface feature device and detecting light scattered thereby by means of a confocal device, the method comprising scanning light from the light source laterally over each of the respective portions of the surface feature device, and scanning a location of a focal point of focussing means of the confocal device in a reciprocating manner along a direction having at least a component substantially normal to the reference plane such that, for each respective portion of the surface feature device, the intensity of light incident on the detector is measured at a plurality of distances of the focal point from the reference plane as measured along a direction normal to the reference plane, the method comprising generating the reader signal in dependence on the intensity of light incident on the detector at respective lateral locations of the beam and at respective distances of the focal point from the reference plane.

The method may comprise identifying, in the reader signal, portions of the signal corresponding to surface feature devices of a first type and portions corresponding to surface feature devices of a second type, the method comprising calibrating the distance of portions of the second type from the reference plane by reference at least in part to the portions of the first type.

The method may comprise calibrating the distance of the portions of the second type from the reference plane by reference at least in part to relative heights of portions of the first and second types and/or by reference at least in part to the distance of the portions of the first type from the reference plane.

The method may comprise scanning light from the light source laterally over each of the respective surface feature portions of the surface feature device by performing a line scan along a row of surface feature portions.

The method may comprise scanning light from the light source laterally over each of the respective surface feature portions of the surface feature device by performing a line scan along each of a plurality of respective rows of surface feature portions.

The method may comprise determining whether data associated with a reader signal generated by the apparatus is stored in a database and providing a signal indicative of whether data associated with the reader signal is stored in the database.

The method may comprise retrieving data associated with the reader signal that is stored in the database.

The method may comprise determining whether data associated with a reader signal generated by the apparatus is stored in a database and retrieving data from the database that is associated with the reader signal in dependence on the determination.

The method may comprise providing an audible and/or visual output indicative of whether data associated with a reader signal generated by the apparatus is stored in a database.

The method may comprise determining whether the reader signal has one or more predetermined characteristics.

Optionally, the steps of directing a beam of light from the light source and detecting by means of the detector light scattered by the surface feature device are performed by means of a laser interferometer device.

In an aspect of the invention for which protection is sought there is provided a method of reading data associated with an identification device in the form of a surface feature device, comprising:

directing a beam of light from a light source at the surface feature device, the surface feature device having a plurality of respective portions each provided at one of a plurality of predetermined distances from a reference plane;

detecting by means of detection means light from the light source that has been scattered or reflected by the surface feature device and generating a light intensity signal indicative of the intensity of light detected by the detection means;

determining the distance of the plurality of respective portions of the surface feature device from the reference plane in dependence at least in part on the light intensity signal; and providing an output responsive to the distance of the plurality of respective portions of the surface from the reference plane.

In one aspect of the invention for which protection is sought there is provided reader apparatus for reading an identification code carried by a surface feature device, the surface feature device having a plurality of portions at respective lateral locations of the device, each portion being provided at one of a plurality of predetermined distances from a reference plane, the identification code being defined at least in part by the plurality of respective distances, the apparatus comprising a light source and a light detector, the apparatus being configured to direct light from the light source onto the surface feature device and to detect by means of the detector light scattered by the surface feature device, the detector being configured to output a detector signal indicative of the intensity of light incident thereon, the apparatus being configured to generate a reader signal responsive at least in part to the distance of each of the respective portions of the surface feature device from the reference plane in dependence on the detector signal.

It is to be understood that by lateral is meant lateral with respect to a surface normal of the surface feature device, i.e. a direction substantially normal to the surface normal.

It is to be understood that the surface feature device may be considered to have an identity defined by the surface feature portions. The reader signal generated by the apparatus may be indicative of the identity of the surface feature device. The reader signal may be uniquely determined by the distance of the surface feature portions of the surface feature device from the reference plane.

The apparatus may be configured to generate the reader signal further responsive at least in part to the relative lateral positions of the respective portions as determined by reference to the detector signal.

The apparatus may comprise an interferometer device, the interferometer device comprising the light source and light detector.

Optionally, the interferometer device is a laser interferometer device.

The apparatus may comprise a confocal device, optionally a laser confocal device.

The apparatus may comprise focussing means configured to cause light from the light source to be brought to a focus at at least one predetermined distance from the focussing means.

Optionally, the light source is configured to emit light at a plurality of predetermined wavelengths, the focussing means being configured wherein light is focussed by the focussing means at a plurality of distances from the reference plane, the plurality of distances corresponding to the plurality of wavelengths.

It is to be understood that the predetermined plurality of distances may correspond substantially to the distances from the reference plane of corresponding reflector surfaces of an identification device that the reader is configured to read.

The apparatus may be configured to adjust a focal point of the focussing means relative to the reference plane.

The apparatus may be configured automatically to scan a location of a focal point of the focussing means in a reciprocating manner along a direction having at least a component substantially normal to the reference plane.

The focal point may be scanned such that the focal point passes through a plane substantially coincident with an expected position of the surface feature elements of a device that the apparatus is expected to read.

Optionally, the apparatus is arranged to scan light from the light source over the surface feature device in order to generate the reader signal.

In embodiments employing a confocal device, such as a confocal imaging device, the confocal device may be configured to scan light from the light source over the surface feature device.

Optionally, the apparatus is configured to scan the location of the focal point of the focussing means in a reciprocating manner along a direction having at least a component substantially normal to the reference plane such that the position of the focal point is scanned at least once along a direction towards and/or away from the surface feature device at each of a plurality of locations or over each of a plurality of regions of a projection of the focal point onto the reference plane.

It is to be understood that scanning of the focal point in a direction normal to the reference plane may be performed with a projection of the focal point onto the reference plane otherwise substantially stationary, or as the projection of the focal point onto the reference plane is scanned over an identification device.

Optionally, the focussing means comprises at least one lens element configured to focus light onto the surface feature device.

Optionally, the focussing means comprises an array of lens elements each configured to focus light onto the surface feature device.

Optionally, the detector is configured to detect light reflected from a surface back through the focussing means.

The apparatus may be configured to determine whether data corresponding to or associated with a reader signal generated by the apparatus is stored in a database and to provide a signal indicative of whether data corresponding to with the reader signal is stored in the database.

The apparatus may be configured to retrieve data corresponding to the reader signal that is stored in the database.

The apparatus may be configured to determine whether data associated with a reader signal generated by the apparatus is stored in a database and to retrieve data from the database that is associated with the reader signal in dependence on the determination.

The apparatus may be configured to provide an audible and/or visual output indicative of whether data associated with a reader signal generated by the apparatus is stored in a database. In some embodiments, in addition or instead the apparatus may be configured to transmit a signal to a computing device indicative of whether data associated with a reader signal generated by the apparatus is stored in a database, for example to a remote server via a wired or wireless datalink, telecommunications network or any other suitable means.

The apparatus may be configured to determine whether the reader signal has one or more predetermined characteristics. For example, the apparatus may be configured to determine whether the reader signal corresponds to an identification code of predetermined length, whether the code has an expected header character or string of header characters, and so forth.

In some embodiments the apparatus may determine whether the reader signal could be a surface feature device originating from a given source, such as the manufacturer of a given product. For example, the apparatus may determine whether the range of distances of portions of a surface feature device from the reference plane are within a predetermined range of distances characteristic of surface feature devices originating from a given source.

In one aspect of the invention for which protection is sought there is provide a method of identifying an object comprising providing reader apparatus for reading an identification code carried by an identification device of the object in the form or a surface feature device according to an aspect of the present invention, and reading data associated with the identification device by means of the reader apparatus.

The method may comprise applying an identification device to the object. The identification device may be applied by forming the device in or on the object, for example by moulding or otherwise indenting a surface of the object, or applying the identification device to an article such as a label or tag and applying the label or tag to the object.

In an aspect of the invention for which protection is sought there is provided a method of reading data associated with an identification device in the form of a surface feature device, the surface feature device having a plurality of portions at respective lateral locations of the device, each portion being provided at one of a plurality of predetermined distances from a reference plane, the identification code being defined at least in part by the plurality of respective distances, the method comprising:

directing light from the light source onto the surface feature device and detecting by means of the detector light scattered by the surface feature device;

outputting a detector signal indicative of the intensity of light incident on the detector; and generating a reader signal responsive at least in part to the distance of each of the respective portions of the surface feature device from the reference plane in dependence on the detector signal.

The method may comprise generating the reader signal further responsive at least in part to the relative lateral positions of the respective portions as determined by reference to the detector signal.

Optionally, the steps of directing a beam of light from the light source and detecting by means of the detector light scattered by the surface feature device are performed by means of a laser interferometer device.

Optionally, the steps of directing a beam of light from the light source and detecting by means of the detector light scattered by the surface feature device are performed by means of a confocal device.

In a further aspect of the invention for which protection is sought there is provided a method of reading data associated with an identification device in the form of a surface feature device, comprising:

directing a beam of light from a light source at the surface feature device, the surface feature device having a plurality of respective portions each provided at one of a plurality of predetermined distances from a reference plane;

detecting by means of detection means light from the light source that has been scattered or reflected by the surface feature device and generating a light intensity signal indicative of the intensity of light detected by the detection means;

determining the distance of the plurality of respective portions of the surface feature device from the reference plane in dependence at least in part on the light intensity signal; and providing an output responsive to the distance of the plurality of respective portions of the surface from the reference plane.

In one aspect of the invention for which protection is sought there is provided a method of reading an identification device comprising:

projecting a beam of light onto a surface bearing the identification device;

focussing light from the light source onto the surface and causing the light to be brought to a focus at one or more distances from a reference plane of the apparatus;

detecting light focussed by the focussing means that has been scattered or reflected by the surface; and determining the distance from the reference plane at which light detected by the detection means was scattered by the surface.

The method may comprise determining the distance from the reference plane at which light detected by the detection means was scattered by a surface in dependence on an intensity of light scattered or reflected by a surface.

The method may comprise causing light from the light source to be brought to a focus at a predetermined plurality of discrete distances from the focussing means.

The method may comprise causing light from the light source to be brought to a focus at a predetermined plurality of discrete distances from the focussing means and not at locations between the plurality of discrete distances.

Optionally, projecting a beam of light onto a surface bearing the identification device comprises projecting a beam of light comprising a plurality of wavelengths.

Optionally, projecting a beam of light onto a surface bearing the identification device comprises projecting a beam of light comprising substantially a single wavelength and not a plurality of wavelengths. That is, projecting a beam of light onto a surface bearing the identification device may comprise projecting a beam of substantially monochromatic light.

In a further aspect of the invention for which protection is sought there is provided reader apparatus for reading an identification code carried by an identification device comprising:

a light source;

focussing means for focussing light from the light source onto a surface and causing the light to be brought to a focus at one or more predetermined distances from a reference plane of the apparatus;

detection means for detecting light focussed by the focussing means that has been scattered or reflected by a surface at the one or more predetermined distances; and means for determining at which of the one or more predetermined distances from the reference plane light detected by the detection means was scattered by a surface.

The apparatus may be configured to determine the one or more distances from the reference plane at which light detected by the detection means was scattered by the surface in dependence on an intensity of light scattered or reflected by the surface.

Optionally, the focussing means is configured to cause light from the light source to be brought to a focus at a predetermined plurality of distances from the focussing means. The focussing means may be part of a confocal arrangement.

Optionally, the light source is configured to emit light of a plurality of wavelengths.

Optionally, the plurality of wavelengths are selected such that light is focussed by the focussing means at a predetermined plurality of distances from the reference plane.

It is to be understood that the predetermined plurality of distances may correspond substantially to the distances of corresponding reflector surfaces of an identification device that the reader is configured to read. Optionally, the plurality of wavelengths are selected such that light is focussed by the focussing means at a predetermined plurality of allowable distances of the reflector surfaces of a given identification device from the reference plane and not at locations therebetween.

Optionally, the focussing means is arranged to scan light from the light source across a surface of an identification device.

Optionally, the focussing means comprises at least one lens element configured to focus light onto the surface of the identification device.

Optionally, the focussing means comprises an array of lens elements each configured to focus light onto the surface.

Optionally, the detection means is configured to detect light reflected from the surface back through the focussing means.

Optionally, the means for determining a distance from the reference plane at which light detected by the detection means was scattered by the surface comprises computing means configured to receive a signal from the detection means indicative of the intensity of light scattered or reflected by the surface as a function of lateral position over the surface and to determine the distance of the surface from the reference plane in dependence at least in part on the signal indicative of scattered light intensity.

Optionally, the computing means is further configured to receive a signal from the detection means indicative of the intensity of light scattered or reflected by the surface as a function of position over the surface with a focal point of light focused by the focussing means at each of a plurality of distances from the reference plane.

Thus the apparatus may implement a confocal imaging methodology in which images of respective slices of the identification device are recorded.

In a still further aspect of the invention for which protection is sought there is provided a method of reading an identification code carried by an identification device comprising:

projecting a beam of light onto a surface bearing the identification device;

focussing light from the light source onto the surface and causing the light to be brought to a focus at one or more predetermined distances from a reference plane of the apparatus;

detecting light focussed by the focussing means that has been scattered or reflected by the surface at the one or more predetermined distances; and determining the distance from the reference plane at which light detected by the detection means was scattered by the surface.

The method may comprise determining the distance from the reference plane at which light detected by the detection means was scattered by a surface in dependence on an intensity of light scattered or reflected by a surface.

The method may comprise causing light from the light source to be brought to a focus at a predetermined plurality of distances from the focussing means, optionally substantially only at the predetermined plurality of distances. Light may be brought to a focus at the predetermined plurality of distances substantially simultaneously, or sequentially as a function of time.

The method may comprise projecting a beam of light onto a surface bearing the identification device comprises projecting a beam of light comprising a plurality of wavelengths. Alternatively the beam of light may be a substantially monochromatic beam of light.

In one aspect of the invention for which protection is sought there is provided a marking device comprising a plurality of marking elements each configured to assume one of a plurality of predetermined positions in each of which the element protrudes a respective different distance from a common reference plane, the device being configured to be provided in a wall of a mould tool defining a mould cavity such that a distance the marking elements protrude into the mould cavity is different for each of the predetermined positions of the marking elements.

This feature has the advantage that an identification device defining an identification code may be formed in a moulded article. The moulded article may be any suitable moulded article such as a product formed from a plastics material, a tablet item such as a pharmaceutical product, a tag such as a security tag of an object such as an item of merchandise, or any other suitable article.

The marking device may alternatively be referred to as a marking tool.

Optionally, the marking elements are movable to required predetermined positions substantially independently of one another.

The marking elements may be arranged to define a substantially regular array of elements.

Optionally, the marking elements have a projected area parallel to the reference plane of less than 0.1 square metre, optionally less than 0.01 square metre.

In a further aspect of the invention for which protection is sought there is provided a mould tool defining a mould cavity comprising a marking device according to another aspect.

In another aspect of the invention for which protection is sought there is provided a method of reading an identification device comprising:

projecting a beam of light onto a surface bearing the identification device;

focussing light from the light source onto the surface and causing the light to be brought to a focus at one or more distances from a reference plane of the apparatus;

detecting light focussed by the focussing means that has been scattered or reflected by the surface; and determining the distance from the reference plane at which light detected by the detection means was scattered by the surface.

Some embodiments of the present invention provide a marking tool for marking an object with an identification device, optionally a substantially covert identification device. The device may be defined by an engineered surface of the object such as a moulded surface, a machined surface, an etched surface or any other suitable surface having an array such as a regular 2D array of reflector elements formed thereon or therein. The reflector elements may each comprise a reflector surface configured to reflect incident light. The reflector surfaces may be defined by recessed regions of the surface of the object, the reflector surfaces being provided at predetermined depths below a reference plane of the object. The reference plane may correspond to the surface of the object that immediately surrounds the device, or other surface. The identification device may be formed substantially entirely by the object itself and not require additional material in order to define the device. For example, the surface of the object may itself be sufficiently light-reflective to enable reading of a code defined by the device by an optical reader device without requiring the addition of reflective material such as the provision of a reflective coating. It is to be understood that the surface of the object itself may be sufficiently light reflective both before and after the recessed regions are formed, or substantially only after the recessed regions are formed. In some embodiments, forming the recessed regions may comprise melting or at least partially melting a surface of the object, and this may at least in part result in the formation of a reflective surface.

The tool may comprise an array of marking elements in the form of elongate shafts defining an array of similar size to the 2D array of reflector elements. The marking elements may be axially movable to predetermined axial positions corresponding to depths of the reflector surfaces below the reference surfaces. The marking elements may be movable by means of microactuators such as thermal microactuators. In some alternative embodiments other means for moving the marking elements may be employed, such as piezoelectric microactuators or any other suitable means.

The marking tool may be configured to be coupled to a mould such that the marking elements are movable to protrude predetermined distances into a mould cavity defined by the mould tool. In use, the marking tool may be configured to set each of the marking elements to predetermined axial positions and subsequently a mould medium such as a liquid plastics material may be injected into the mould tool such that the mould medium surrounds at least a portion of each marking element, forming the identification device. The liquid plastics material may be a molten plastics material heated to liquid phase or a liquid plastics material that is arranged to solidify or harden following injection into the mould tool.

The device may be 'read' using a reader device configured to determine the relative depths of the reflector elements below the reference surface. Advantageously, the reader device may be or comprise an optical reader device.

Some embodiments of the present invention have the advantage that sequential marking of respective articles may be performed in a convenient and cost effective manner. This is because the positions of the marking elements and therefore the relative heights of the reflector elements may be changed for each object marked, or for respective batches of objects marked. Thus, for each object produced using the mould or each batch of objects produced, a different arrangement of positions of the marking elements may be employed. It is to be understood that it may be highly advantageous in some applications to be able uniquely and covertly to mark a given object or batch of objects, for example in certain high value product applications.

In one aspect of the invention for which protection is sought there is provided a marking device for forming an identification device in a surface, the identification device comprising indentations in a surface, the marking device comprising an array of movable marking elements each configured to assume one of a plurality of predetermined positions by means of at least one actuator comprised by the device under the control of a controller, wherein in each predetermined position the element protrudes a respective different predetermined distance from a common reference plane, the device being configured to at least partially embed the marking elements in a surface of an article to form indentations of different respective depths therein, the respective depths corresponding to the predetermined distances from the common reference plane that the marking elements may protrude.

The marking device may be configured to form a covert identification device in a surface.

Optionally, each marking element is provided with a respective actuator.

Optionally, each marking element is provided with a respective actuator comprising a piezoelectric drive.

Suitable piezoelectric drive actuators are available, for example from Physik Instrumente (PI) GmbH & Co. KG, Karlsruhe, Germany.

Alternatively, an actuator comprising a thermal actuator, a mechanical wormscrew actuator or any other suitable actuator may be employed.

Optionally, the marking elements are movable to required predetermined positions substantially independently of one another.

Optionally, the marking elements are arranged to define a substantially regular array of elements.

Optionally, the marking elements have a projected area parallel to the reference plane of less than 0.1 square metre, optionally less than 0.01 square metre.

Optionally, the array of elements is less than 1 cm square.

Optionally, the array of elements is less than 0.5 cm square.

Optionally, the array of elements is less than 0.25 cm square.

Optionally, the array of elements is less than 0.1 cm square.

Optionally, the device further comprises a plurality of substantially fixed marking elements in addition to the movable marking elements.

The substantially fixed marking elements may be arranged to form the surface feature elements of first type referred to above, whilst the movable marking elements may be arranged to form the surface feature elements of second type referred to above.

Optionally, a plurality of the movable marking elements are spaced apart from one another by at least one substantially fixed marking element.

Optionally, each of the plurality of movable marking elements are spaced apart from one another by at least one substantially fixed marking element.

The device may be configured to at least partially embed the substantially fixed marking elements and the movable marking elements in a surface of an article to form indentations of different respective depths therein wherein the substantially fixed marking elements are arranged to define an identification code.

The device may be configured to cause local softening of a surface in contact therewith.

It is to be understood that local softening may lead to local melting in some embodiments or applications.

The device may comprise heating means for locally heating a surface in contact therewith.

The device may comprise ultrasonic excitation means for exciting the device at an ultrasonic frequency and causing local softening of the surface.

This feature has the advantage that thermal degradation of the substrate may be reduced by locally heating the surface, relative to techniques in which an entire article must typically be heated in order to cause softening.

The device may be configured to be provided in a wall of a mould tool defining a mould cavity, wherein indentations of the different respective depths may be formed in a moulded article formed by means of the mould tool.

In an aspect of the invention for which protection is sought there is provided a mould tool defining a mould cavity, the mould tool comprising a marking device according to a preceding aspect, wherein the marking device is arranged to form an identification device in a surface of an article formed in the mould cavity.

In a further aspect of the invention for which protection is sought there is provided a mould tool according to the preceding aspect and a controller, the controller being configured to receive a pressure signal indicative of a pressure within the mould cavity, the controller being configured to cause the plurality of actuators to apply force to the respective movable marking elements, the amount of force depending at least in part on the pressure signal.

In an aspect of the invention for which protection is sought there is provided a method of forming an identification device comprising: providing a marking device for forming an identification device in a surface according to a preceding aspect or a mould tool according to a preceding aspect; and forming an identification device in a surface of a first object.

Optionally, the first object is an object to be identified by the identification device.

The first object may be any object to be identified such as an item of jewellery, a luxury goods item such as a handbag, purse, wallet, watch, an electronics device such as a smartphone, laptop computer or tablet, a pharmaceutical item such as a tablet, pill, capsule or the like, a part such as an aircraft component, a motor vehicle component or the like, or any other object to be identified, preferably covertly. By covert identification device is meant that the presence of the identification device may not be immediately apparent with the naked eye to a casual observer.

The method may comprise applying the first object to a second object.

The first object may be a label or tag and the second object may be an object to be identified by the identification device.

In an aspect of the invention for which protection is sought there is provided an identification device comprising a surface feature device carrying an identification code, the surface feature device having a plurality of surface feature portions at respective predetermined lateral locations of the device, each surface feature portion being provided at one of a plurality of predetermined distances from a lateral reference plane, the identification code being defined at least in part by the lateral location of each surface feature portion and the distance of each surface feature portion from the lateral reference plane.

The identification code may be defined at least in part by the relative lateral location of each surface feature portion, i.e. the lateral location of the surface feature devices relative to one another.

Some identification devices according to embodiments of the present invention may be referred to as traceable anti-counterfeit taggants since they may be used to apply a traceable identification code to an object, either directly in the surface of the object, or on a tag or label that may be applied to the object. Identification devices according to embodiments of the present invention may be employed for covert identification, including authentication of product origin. Some embodiments of the present invention enable a user or acquirer of a product to have confidence that the product originated from a particular source and thereby enhance user confidence in a given product. Reliable verification of origin of a given product may be critical in a given situation in order to identify counterfeit goods. For example, identification of counterfeit products may be critical in the purchase of replacement components for aircraft or the like where the use of counterfeit products may endanger the safety of an aircraft.

In one aspect of the invention for which protection is sought there is provided an identification device comprising a surface feature device carrying an identification code, the surface feature device comprising a plurality of indentations in a major free surface thereof, each indentation being provided at a respective predetermined lateral location of the major free surface of the device, each indentation defining a surface feature portion a predetermined depth below the major surface of the device, the surface feature portions being free surfaces arranged to scatter light at the predetermined depth, being a predetermined distance from a lateral reference plane, the identification code being defined at least in part by the lateral location of each surface feature portion and the distance of each surface feature portion from the lateral reference plane.

Optionally the surface feature portions comprise a surface that is substantially parallel to the major surface.

The surface feature portions may be arranged to reflect, through substantially 180 degrees, light incident thereon travelling substantially parallel to a direction normal to the major surface.

Substantially the whole area of a given surface feature portion may be substantially equidistant from the reference plane. Thus, when imaged using a confocal imaging arrangement along a direction normal to the reference plane, substantially the whole area of a given surface feature portion may be simultaneously in focus.

Optionally, the lateral reference plane is substantially coincident with the major surface of the identification device.

Thus the distance of each surface feature portion from the lateral reference plane may be substantially equal to the depth of each surface feature portion below the major free surface.

Optionally, the predetermined lateral locations of the major free surface at which the surface feature portions are provided form a regular m×n array where m≥1 and n≥2.

Optionally, the surface feature portions are provided at one of at least a plurality of predetermined depths below the major surface of the device.

In an aspect of the invention for which protection is sought there is provided an object comprising an identification device according to a preceding aspect Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 1(a) shows an identification device 100 according to an embodiment of the present invention formed in a surface 190S of a substrate 190. The surface 190S may be referred to as a major free surface of the substrate. The substrate 190 defines a tag 190T illustrated in FIG. 1(b). The tag 190T may be attached to an article (not shown), for example by means of a tether such as cord, by means of an adhesive, or by any other suitable means. In the embodiment of FIG. 1 the tag 190T also has a conventional barcode 192 printed thereon although the conventional barcode may be omitted in some embodiments. It is to be understood that in some embodiments the identification device 100 may be formed substantially directly on an article such as a casing of an electronic device, a surface of an item of jewelry, a time piece such as a wristwatch or any other article of interest.

Figure 1:
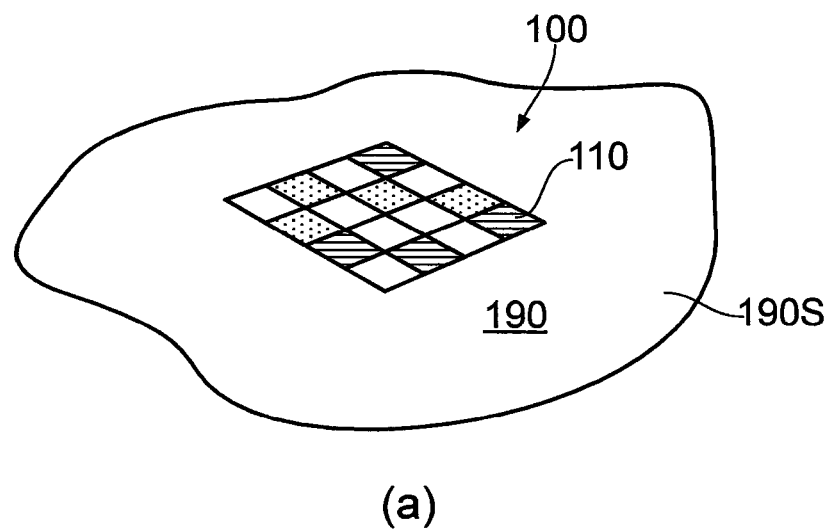
FIG. 1 is a schematic illustration of (a) a covert identification device according to an embodiment of the present invention and (b) a tag bearing the covert identification device shown in (a)
Figure 1:
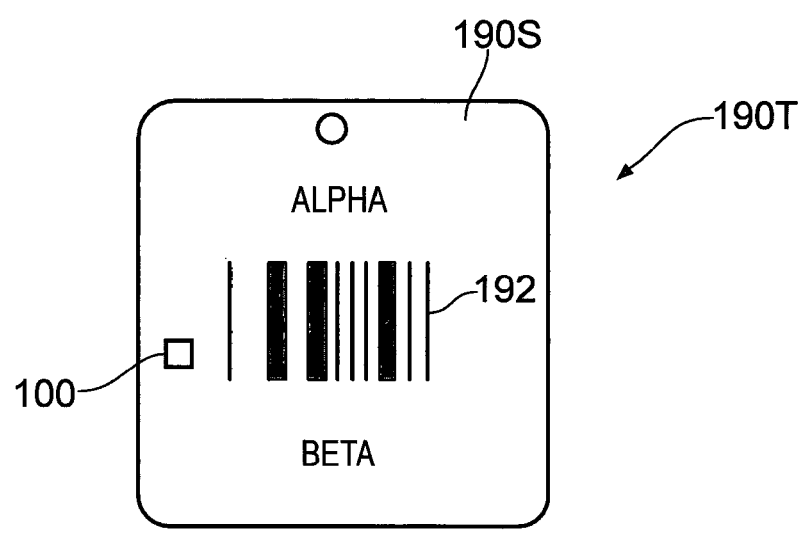

The identification device 100 of the embodiment of FIG. 1(a) is in the form of a 4×4 array of substantially square surface feature elements or portions 110. In the embodiment of FIG. 1 the device is of size approximately 2 mm×2 mm although other sizes are also useful. Other array dimensions are also useful, such as 1×n, 2×n, 3×n, 5×n or any other suitable size where n is a number from 2 to any suitable number such as a number in the range 3 to 5, 3 to 10, 3 to 50, 3 to 100, 3 to 1000 or any other suitable range. Thus, in some embodiments the array may be a one dimensional (1 D) linear array, with a single row of surface feature elements. In one embodiment the array is a 1×12 array. In some embodiments m×n array is provided where m≥1 and n≥2, or m≥2 and n≥2.

Each surface feature element 110 is either substantially level with the substrate surface 190S or at one of two depths d1, d2 below the surface 190S. In the embodiment shown the two depths are d1=5 microns and d2=10 microns, respectively. In FIG. 1(a) surface feature elements 110 that are substantially level with the substrate surface are shown blank, surface features elements 110 that are at a depth d1 are shown hatched and surface feature elements 110 that are at depth d2 are shown dotted. It is to be understood that the identification device 100 may be configured to encode data according to the depth at which surface feature element 110 is located with respect to the surface 190S. The bar code may be considered to be a 3D bar code due to the fact that the surface defined by the surface feature elements 110 in order to encode data is a 3D surface.

FIG. 2 is a schematic illustration of a device 200 according to a further embodiment of the present invention in (a) plan view and (b) is a surface profile along line A-A. Like features of the embodiment of FIG. 2 to those of the embodiment of FIG. 1 are shown with like reference signs prefixed numeral 2 instead of numeral 1.

Figure 2A:
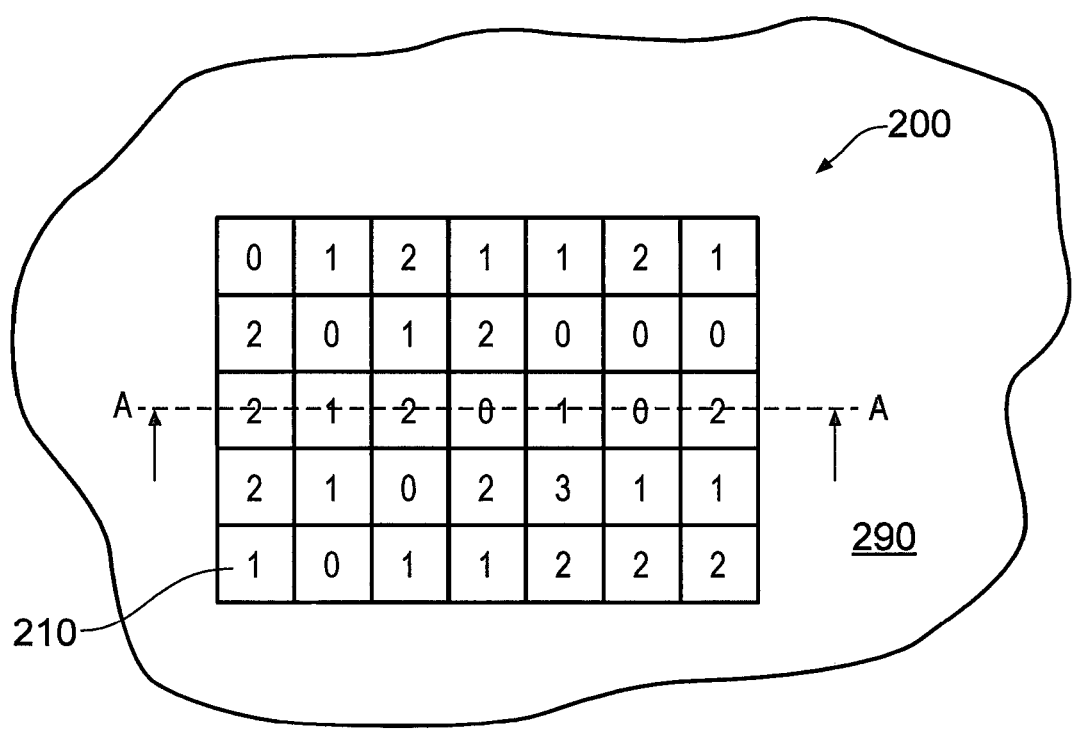
FIG. 2 is a schematic illustration of (a) an identification device according to a further embodiment of the present invention and (b) a surface profile along A-A of a portion of the device shown in (a)
Figure 2B:
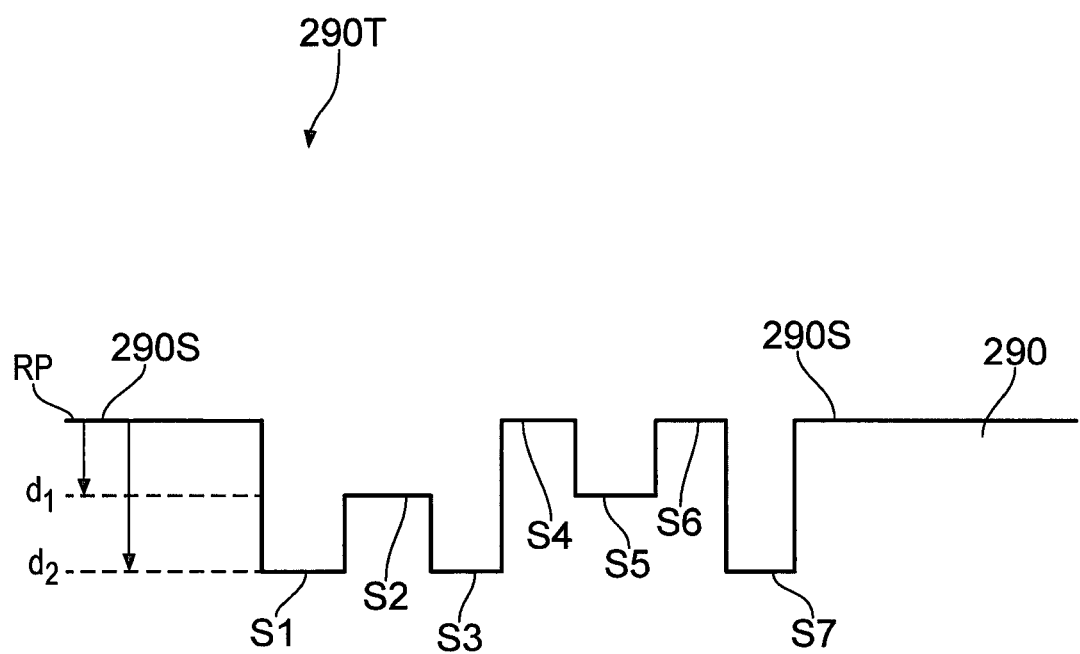

The device 200 of FIG. 2 comprises a 5×7 array of surface feature elements 210 similar to those of the embodiment of FIG. 1. Respective surface feature elements 210 of the device 200 along line A-A are labelled S1 to S7 in FIG. 2(b).

The surface feature elements 210 are formed either substantially at the same level as a surface 290S of the substrate 290 (such features are labelled '0' in FIG. 2(a)), or at a distance of either d1=5 microns (labelled '1' in FIG. 2(a)) or d2=10 microns (labelled '2' in FIG. 2(a)) below the surface of the substrate 290, which may be considered to provide a 'reference surface' or 'reference plane'. It is to be understood that, for a given n×n or n×p array, where n and p are integers and at least one of n or p is greater than unity, the amount of data encoded by the array may be increased by increasing the number of respective depths at which surface feature elements 210 may be provided.

Figure 3:
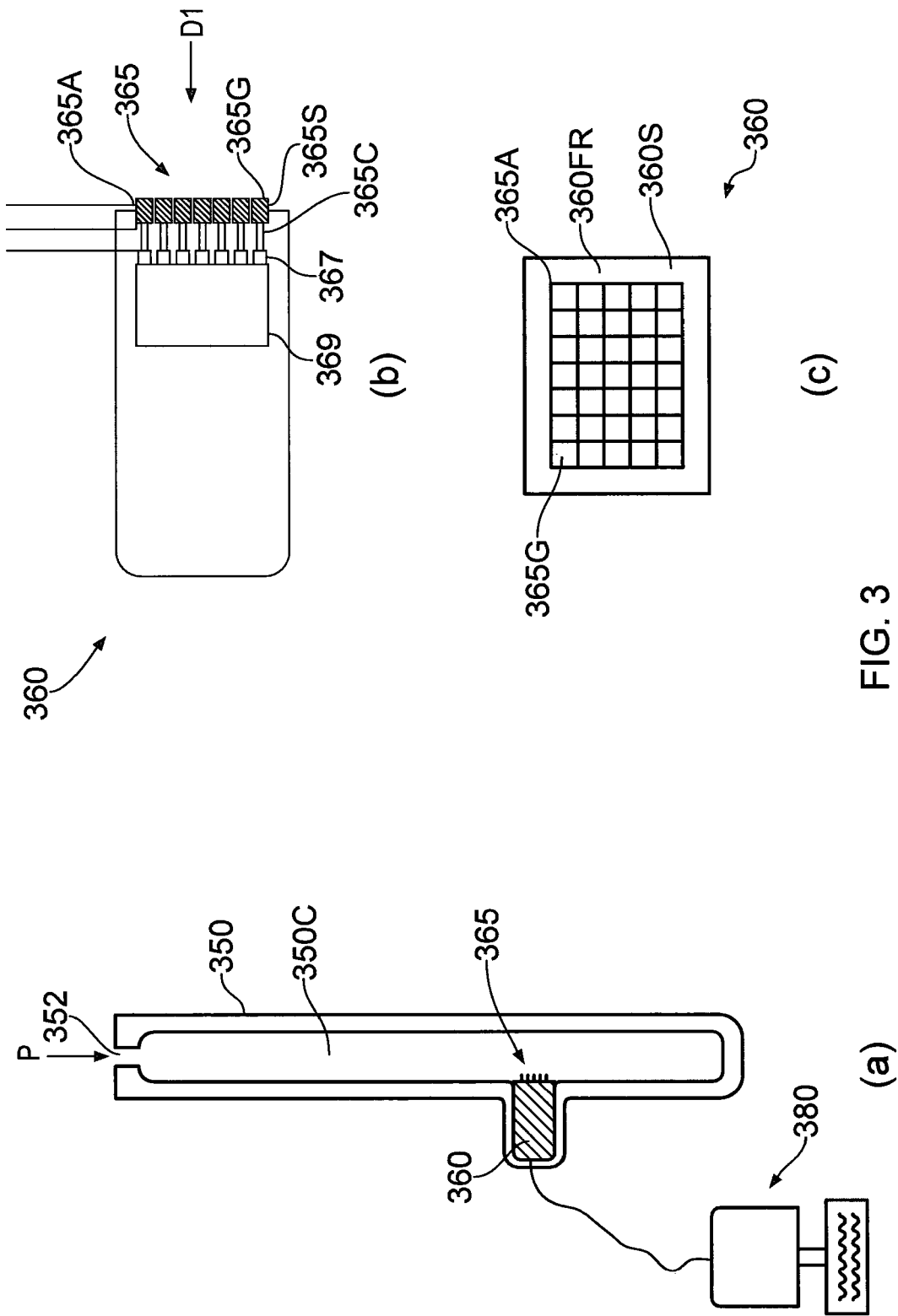
FIG. 3 is a schematic illustration of (a) a mould comprising a marking tool or marking device according to an embodiment of the present invention, (b) a cross-sectional view of the marking tool shown in (a) and (c) a front view of the tool shown in (b) along direction D1 indicated in (b)

It is to be understood that in some embodiments a marking tool may be used to form the device 200 in the surface of a substrate 290 after the substrate has been fabricated, and not in-situ during manufacture such as for example during injection moulding (see FIG. 3 and associated discussion). In the case of ex-situ marking, the marking tool may be configured to form a local reference surface 290S on the surface of the substrate 290, which may be below the level of the surface of the substrate 290 prior to forming the device 200, the purpose of the reference surface 290S being to allow a reader apparatus or reader device that is arranged to 'read' the identification device to determine the depths of the surface feature elements relative to a substantially fixed reference plane.

It is to be understood that the arrangement of respective different heights of the surface feature elements 210 may be arranged to correspond to data such as a 5×7 array of numbers although other array sizes may be useful.

For example, surface feature elements level with the substrate surface may represent numeral '0', surface feature elements at depth d1 may represent numeral '1' and surface feature elements at depth d2 may represent numeral '2'. Other arrangements may also be useful. The surface features may, in addition or instead, represent letters or any desired alphanumeric character, symbol or other device.

In some embodiments, instead of being substantially square, the surface feature elements may be substantially circular in plan view, or of any other suitable shape such as rectangular, elliptical, oval or any other suitable shape. Advantageously, in some embodiments the shape of the surface feature elements is such that the elements form a tessellation with substantially no gaps between surface feature elements. Consequently, the surface feature elements may be more densely packed together. Furthermore, in this case a frame or other structure may not be required to border a portion of one or more mechanical pin elements used to fabricate the structure as described in more detail below. Consequently, ingress of material into gaps between pin elements during fabrication such as during pressing or injection moulding may be prevented or reduced.

In some embodiments, a frame or other structure may nevertheless be desirable as discussed below.

The surface feature elements 110, 210 may be produced by any suitable technique. However it is to be understood that in some applications it is desirable to provide a plurality of devices each having a unique sequence of depths of surface feature elements of the array represented by the device. That is, the depth of at least one surface feature element 110, 210 of one device 100, 200 is different from that of the corresponding feature element of another device 100, 200.

In some applications of the present technology, each device 100, 200 may have a unique arrangement of depths of surface feature elements 110, 210. In some applications each of a plurality of devices of a respective batch of devices 100, 200 may have a unique arrangement of depths of surface feature elements 110, 210. This feature allows 'sequential marking' to be implemented in which respective devices 100, 200 are fabricated having arrangements of surface feature elements 110, 210 that have a predetermined sequence, enabling the position of the device 100, 200 within a sequence of devices to be determined according to the arrangement of depths of respective surface feature elements of the device 100, 200. This may be useful in determining the time and/or date on which a device 100, 200 was produced, and/or other information in respect of origin or other aspect of a given device 100, 200.

The information stored may relate, for example, to date, time and place of production together with a unique identification number or a reference code plus a unique number such as a unique serial number. The reference code may be any suitable code, for example a Global Trade Item Number (GTIN) code, for example a GTIN code according to GS1 Standards, e.g. in the form of 14 numeric digits.

One way of forming surface feature elements will now be described by way of non-limiting example. In one embodiment, a tag 290T similar to that shown in FIG. 1 may be formed by means of apparatus that is configured for injection moulding using a mould 350 illustrated in FIG. 3(a). The mould 350 defines a mould cavity 350C that has an inlet 352 through which molten plastics material P may be injected to substantially fill the mould cavity 350C. An encoding tool 360 is provided in a sidewall of the mould 350. The tool 360 is configured to form in the tag 290T an identification device 200 similar to that illustrated in FIG. 2(a). The encoding tool 360 may also be referred to herein as a marking tool or marking device.

The encoding tool 360 is illustrated in more detail in cross-sectional side view in FIG. 3(b) and in end view in FIG. 3(c). FIG. 3(c) shows the encoding tool 360 as viewed along direction D1 of FIG. 3(b).

The encoding tool 360 has a 5×7 array of pin elements 365 that protrude from a front face 360FR of the tool 360 into an interior of the mould cavity 350O. The pin elements 365 may be referred to as marking elements since their purpose is to form surface feature elements in a moulded article.

The pin elements 365 present a substantially square cross-section into the mould cavity 350C and are fixedly mounted to microactuators in the form of thermal expansion elements 367. The thermal expansion elements 367 are in turn fixedly mounted to a power supply module 369. The power supply module 369 is in communication with a computing device 380 configured to cause the module 369 to deliver power to one or more expansion elements 367 as required.

The thermal expansion elements 367 are configured to expand and cause translation of the pin elements 365 in an axial direction into the mould cavity 350C when electrical current is supplied to them by the power supply module 369. Thus, expansion of a given thermal expansion element 367 causes the pin element 365 to which it is attached to move axially into the mould cavity 350C, changing the interior surface profile of the mould cavity 350C and causing molten plastics material in the mould cavity 350C to conform to the 3D shape defined by the array of pin elements 365. It is to be understood that microactuators other than thermal expansion elements 367 as described herein may be employed in some embodiments such as piezoelectric devices or any other suitable devices. In some embodiments, use of piezoelectric devices may enable the production of identification devices having surface feature elements at respective depths that differ in depth by amounts as low as 1 micrometer or less. In such embodiments a 2×2 array of surface feature elements may be fabricated in which respective elements are provided at depths of from zero to 30 microns below a reference plane, enabling over 1.5 million unique devices 100, 200 to be fabricated. Other maximum depths may be employed in some embodiments, including up to 100 microns or deeper. It is to be understood that, where a piezoelectric device is employed to displace each pin element 365, the amount by which the device displaces a given pin element 365 may be proportional to an electrical potential applied to the device.

In the embodiment of FIG. 3 the pin elements 365 are arranged to slide in a direction into and out from the mould cavity 350C within a sleeve 360S that surrounds the array of elements 365. In the present embodiment the pin elements 365 are formed from an iron-nickel alloy such as Invar (FeNi36), being a material of relatively low coefficient of thermal expansion. This reduces the amount by which the pin elements 365 expand due to heating, and therefore reduces the risk that axial movement of a pin element 365 is limited or prevented due to interference with another pin element 365 or the sleeve 360S. Other materials may also be useful in addition or instead in some embodiments, such as Kovar®, a stainless steel, a ceramic material, a high temperature plastics material or any other suitable material including other metals and alloys.

When power to a given thermal expansion element 367 is switched off, the element 367 cools rapidly and the pin element 365 attached thereto moves axially in a direction out from the mould cavity 350C. It is to be understood that in the present embodiment an axial position of the pin element 365 relative to a position when no current is supplied to it depends on the temperature of the thermal expansion element 367 and therefore the amount of current supplied to it by the power supply module 369. In the present embodiment, the power supply module 369 is configured to deliver two respective different amounts of current to each thermal expansion element 367 in addition to substantially no current, as required, such that surface feature elements 210 may be formed at two different depths d1 and d2 below a reference plane RP as shown in FIG. 2(*b*), which in the embodiment of FIG. 2(*b*) corresponds to a depth of zero below the surface 290S of the substrate 290. In some embodiments the power supply module 369 is configured to monitor a position of a given pin element 365 and modulate the amount of current supplied to the corresponding thermal expansion element 367 to maintain the pin element 365 in a given position. In some embodiments, in addition or instead, the power supply module 369 is configured to monitor the temperature of the thermal expansion element 367 of a given pin element 365 and modulate the amount of current in order to maintain the temperature at a predetermined value in order to maintain the pin element 365 in the desired axial position. Other arrangements may be useful.

In the present embodiment, as shown in FIG. 3, the pin elements 365 have a first portion 365C of substantially circular cross-section, coupled to the respective thermal expansion element 367, and a second portion 365S of substantially square cross-section coupled to an opposite end of the first portion, the second portion 365S being arranged to protrude into the mould cavity 350C. The pin elements 365 are configured such that the second portions thereof may slide in contact with one another when actuated by means of the thermal expansion elements 367. This feature has the advantage that molten plastics material may be substantially prevented from seeping between respective adjacent pin elements 365. The pin elements are arranged such that if respective adjacent pin elements 365 are at positions corresponding to the reference plane RP and depth d2, respectively, i.e. at opposite extremes of travel, an area of contact between respective second portions 365S of square cross-section remains, providing a seal to prevent molten plastics material from seeping beyond the second portions and into contact with the first portions 365C. It is to be understood that other arrangements may be useful in some embodiments.

The computing device 380 may be configured to cause the power supply module 369 to set the amount of current supplied to each of the 35 thermal expansion elements 367 so as to produce an identification device 200 with any desired combination of depths of the 35 surface feature elements 210 thereof, each surface feature element 210 having a depth selected from amongst (1) a reference depth corresponding to the position of a reference plane RP, (2) a first depth d1 below the reference plane RP, and (3) a second depth d2 below the reference plane RP. In some embodiments the reference plane RP may be substantially level with a major surface of the tag 290T in which the identification device 200 is formed. In the present embodiment, the first depth d1 is substantially 5 microns below reference plane RP (which is at a depth of substantially zero below substrate surface 290S in the present embodiment, level with the portion of the tag surface surrounding the device 200) and the second depth d2 is substantially 10 microns below reference plane RP.

As noted above, the pin elements 365 of the embodiment of FIG. 3 present a substantially square cross-section within the mould cavity 350C. Other cross-sectional shapes may be useful in some embodiments, such as substantially circular, oblong or any other suitable shape. In some embodiments a free end of one or more of the pin elements 365 may be provided with an indentation and/or protrusion defining one or more indicia such as a logo, one or more letters, or other indicia. This may allow a corresponding surface detail to be formed in a surface feature element produced using the one or more pin elements 365. This may provide an additional security feature, making the task of counterfeiting a given identification device more difficult.

In some embodiments, the injection moulding apparatus may include a pressure measuring arrangement for measuring a pressure of molten material in the mould cavity 350C of the mould tool 360. The apparatus may be configured to set the pin elements 365 to the required relative positions for forming the required identification device and the molten material subsequently injected into the mould cavity 350C. The encoding tool 360 may be configured such that an increase in pressure within the cavity 350C due to injection of polymer therein does not cause the pin elements 365 to be displaced from their required relative positions by more than a predetermined tolerance. In one embodiment the apparatus achieves this by applying a force to each in a direction pin element 365 in a direction against that of the force on the pin element 365 due to pressurisation of the cavity 350C, either by means of an inherent resistance of the microactuators used to move the pin elements 365 such as the thermal expansion elements 367 or other actuator such as piezoelectric devices.

As noted above, piezoelectric actuators may be employed to displace the pin elements 365 to the desired positions in some embodiments. In some embodiments, the potential applied to a given pin element 365 may depend at least in part on the pressure within the cavity 350C as measured by a cavity pressure measuring device. A controller 380 may be configured to adjust the potential and/or current supplied to one or more of the piezoelectric devices in dependence on the pressure in the cavity in order to maintain the pin elements 365 in the desired positions. In some embodiments, the greater the pressure within the cavity, the greater the potential and/or current supplied to a given piezoelectric actuator to maintain the actuator and therefore the corresponding pin element 365 in a predetermined position.

The depths of the surface feature elements 110, 210 formed in a given article such as a tag 190T, 290T may be 'read' by a suitable reader. Non-limiting examples of suitable readers will now be described. It is to be understood that a reader may be referred to herein interchangeably as a reader, a reader device or a reader apparatus.

Figure 4:
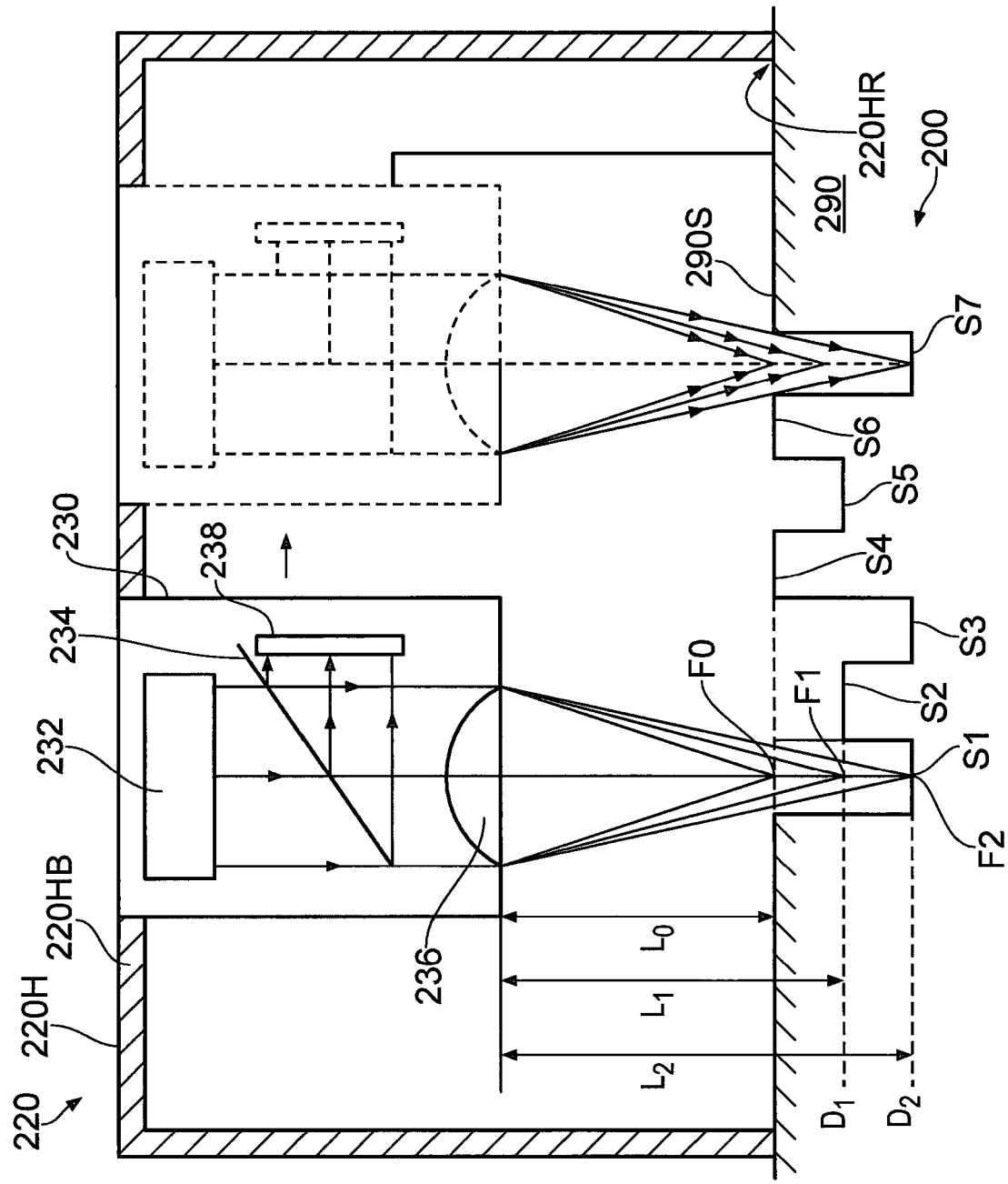
FIG. 4 is a schematic illustration of an identification device reader apparatus or device according to an embodiment of the present invention in cross-sectional view.

FIG. 4 is a cross-sectional view of a reader device 220 according to an embodiment of the present invention. The reader device 220 has a housing 220H that is substantially hollow and in the shape of an inverted cup. The housing 220H is arranged to be placed on a substrate 290 with a rim of the housing 290HR resting in abutment with the surface 290S of the substrate 290. The housing is arranged to be placed on a substrate 290 such that the housing substantially surrounds an identification (or 'security') device 200 according to an embodiment of the present invention formed on the substrate 290. The substrate 290 of FIG. 4 is similar to that of FIG. 2 and like features are labelled with like reference signs.

The reader device 220 has a movable carriage portion 230 that may be moved across a basal portion 220HB of the housing 220H to allow the carriage portion 230 to be scanned in an X-Y plane, parallel to the surface 290S of the substrate 290 bearing the identification device 200. The reader device 220 may be configured to move the carriage portion 230 across the basal portion 220HB along an X-direction, parallel to a row of surface feature elements 110, 210, and to detect changes in height of the surface feature elements along a Z axis normal to a surface of the surface 290S as described below.

The carriage portion 230 contains a light source 232 configured to project a beam of light through a partially reflecting planar optical element 234 which is positioned with a surface normal thereto at an angle of substantially 45 degrees to a direction of propagation of light from the source 232. In some embodiments the planar optical element 234 is a half-silvered mirror element although other elements such as holographic optical elements (HOEs) may also be useful in some embodiments.

After passing through the optical element 234 the beam is incident on focussing means in the form of a lens element 236 that is configured to focus the beam of light to a focal point.

In the present embodiment, the light source 232 comprises three laser diode devices, each configured to generate light of a different respective wavelength. In the present embodiment the devices are light emitting diodes generating red, green and blue light respectively. Other colours or wavelengths may be useful in some embodiments.

The beams of respective different wavelengths are focussed by the lens element 236 to focal points at different respective distances from the lens element 236. The shorter wavelength, blue light is focussed to a focal point F0 a distance L0 from the lens element 236. The green light is focussed to a focal point F1 a distance L1 from the lens element 236, whilst the red light is focussed to a focal point F2 a distance L2 from the lens element 236.

It is to be understood that the reader device 220 is configured such that when the device 220 is placed on a substrate 290 bearing an identification device 200, the lens element 236 is positioned a distance substantially equal to L0 from the surface.

The carriage portion 230 also has a CMOS photodiode detector element 238 arranged to receive light from the light source 232 that has been reflected back through the lens element 236 from a surface. The detector element 238 is positioned in a beam path of light that has passed back through the lens element 236 from a surface and been further reflected by the optical element 234. The element 238 comprises an array of CMOS photodiodes responsive to light generated by the light source 232.

In use, the carriage portion 230 is scanned across the surface feature elements S1-S7 of each row of surface feature elements 210 and the intensity of red, green and blue light detected by detector element 238 measured as the carriage portion is scanned. That is, the carriage portion 230 is scanned over a two dimensional area of dimension corresponding to that of the array of surface feature elements 210. A computing device coupled to the detector element 238 receives RGB data in respect of colour and intensity of light detected by respective pixels (provided by photodiodes) of the detector element 238 and processes the data received to determine the relative depth of each surface feature element 210 in dependence on the data. That is, the distribution of intensities of red, green and blue light provides an indication of the relative depths of each surface feature element 238.

Figure 5:
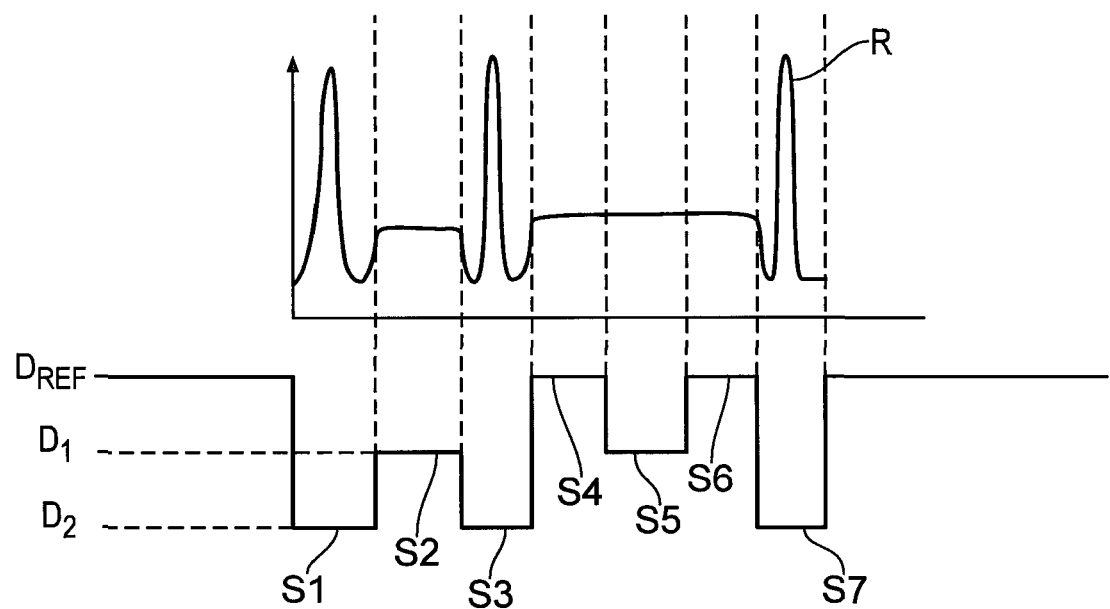
FIG. 5 shows an intensity of reflected right of a particular wavelength as a function of position of a carriage of the reader of the embodiment of FIG. 4 with respect to the identification device being read.

FIG. 5 illustrates schematically the variation in intensity of red light detected by the detector element 238 as a function of position across the detector element 238. It is found that a peak in red light intensity is observed when the red light reflected by a surface feature element a distance L2 from the lens element 236, relative to the intensity of red light reflected by surface feature elements at distances L0 and L1 from the lens element 236, as the carriage portion 230 is scanned. A corresponding effect is observed for the green and blue light, for surface feature elements at distances L1 and L0, respectively.

Figure 6:
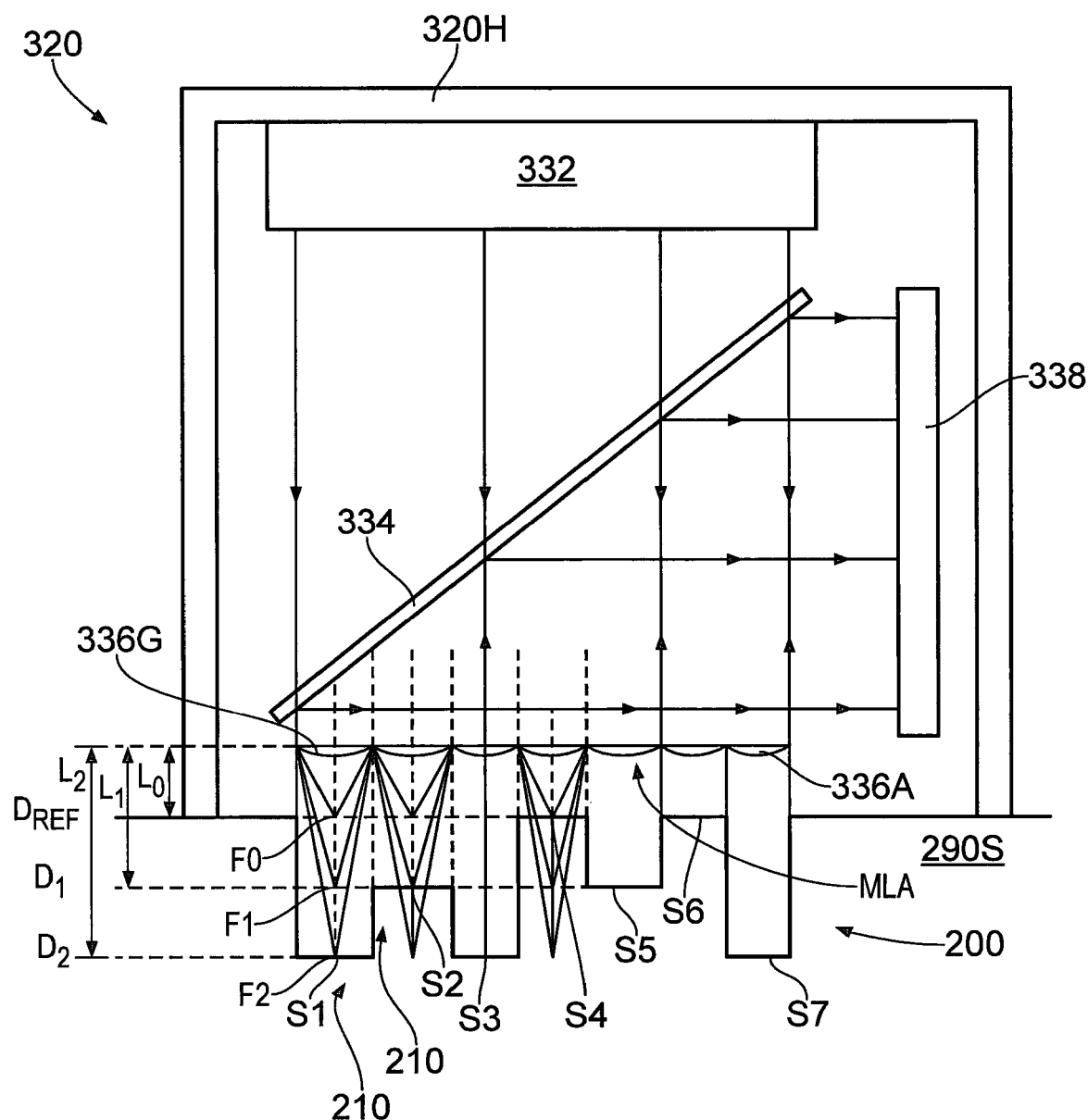
FIG. 6 is a schematic illustration of an identification device reader according to a further embodiment of the present invention in cross-sectional view.

FIG. 6 is a schematic illustration of a reader device 320 according to a further embodiment of the present invention. Like features of the device 320 of FIG. 6 to those of the embodiment of FIG. 4 are shown with like reference signs incremented by 100.

The device 320 has a housing 320H in the shape of an inverted cup, similar to the housing 220H of the device 220 illustrated in FIG. 4. The device 320 is arranged to rest on a substrate 290S bearing an identification device 200 in a similar manner to the device 220 illustrated in FIG. 4. The device 320 has a substantially fixed light source 332 provided within the housing 320H. The light source 332 comprises three laser diode devices in a similar manner to the device 220 of FIG. 4, each configured to generate light of a different respective wavelength. In the present embodiment the devices are light emitting diodes generating red, green and blue light respectively. The light source 332 is configured to project a beam of substantially parallel rays of light towards the substrate 309S. The light passes through a partially reflecting planar optical element 334 which is positioned with a surface normal thereto at an angle of substantially 45 degrees to a direction of propagation of light from the source 332. In some embodiments the planar optical element 334 is a half-silvered mirror element although other elements such as holographic optical elements (HOEs) may also be useful in some embodiments.

After passing through the optical element 334 the beam is incident onto focussing means in the form of a microlens array MLA. The MLA comprises a substantially rectangular array of 5 rows of 7 lens elements 336A-G, the array being of a size corresponding to that of the identification device 200 to be read by the reader device 320. Thus, in the present embodiment the MLA is in the form of an array of 5 rows of 7 lens elements 336A-G. The MLA is arranged such that in use the reader device 320 may be positioned such that each of the 35 lens elements directly face a corresponding surface feature element 210 of the identification device 200.

Accordingly, a 5×7 array of beams of red, green and blue light may be focussed by the lens elements 236 to focal points at different respective distances from the MLA. The shorter wavelength, blue light is focussed towards a focal point F0 a distance L0 from the lens element 236. The green light is focussed to a focal point F1 a distance L1 from the lens element 236, whilst the red light is focussed to a focal point F2 a distance L2 from the lens element 236. It is to be understood that the focussed light may be reflected by a surface of the substrate 290S before the light is able to travel a distance L1 or L2 as described below.

It is to be understood that the reader device 320 is configured such that when the device 320 is placed on a substrate 290S bearing an identification device 200, the MLA is positioned a distance substantially equal to L0 from the surface.

The reader device 320 has a CMOS photodiode detector element 338 arranged to receive light from the light source 332 that has been reflected back through the MLA by the identification device 200. The detector element 338 is positioned in a beam path of light that has been reflected back through the MLA and been further reflected by optical element 334.

In use, light from the light source 332 is projected through the MLA and light reflected by the surface feature elements 210 of the identification device 200 detected by the detector element 338. The intensity of red, green and blue light detected by detector element 338 across an active area therefore is measured and intensity and colour data supplied to an associated computing device. The computing device analyses the data received and determines the relative depths of the surface feature elements 210 based on the intensity distribution of red, green and blue light reflected by the identification device 200 and received by the detector element 338. Based on the relative depths, the computing device is able to determine the identification code or data to which the distribution of depths of the surface feature elements 210 corresponds.

It is to be understood that some embodiments employing a MLA may enable more rapid reading of a given identification device 200 at least in part because it is not necessary to scan a beam of light across the device 200. Thus, the relative heights of surface feature elements 210 may be 'read' in a parallel manner rather than a serial manner, reducing the amount of time required to read the device 200.

In some alternative embodiments, the reader device may employ a different method of identifying the depths of respective surface feature elements 210. In one embodiment, a reader device employs a laser interferometer device to determine either the distance of respective surface feature elements from the interferometer device, or the relative heights of respective surface feature elements, in order to 'read' the pattern of surface feature elements of a device. Embodiments employing a laser interferometer device may be provided in a similar housing 220H, 320H to the devices of FIG. 4 and FIG. 6. The laser may be of any suitable wavelength. For example the laser may have a wavelength in the infra-red region of the electromagnetic spectrum, visible region or ultra violet (UV) region.

In some alternative embodiments, a confocal system may be used to determine actual or relative heights of surface feature elements of an identification device 100. The use of such systems in reading encoded data is known. An example of a reader device 420 employing such a system is shown at 420 in FIG. 7. Like features of the embodiment of FIG. 7 to those of the embodiment of FIG. 4 are identified with like reference signs prefixed numeral 4 instead of numeral 2.

The reader device 420 has a housing 420H that is substantially hollow and in the shape of an inverted cup. The housing 420H is arranged to be placed on a substrate 490 with a rim 420HR of the housing 490H resting in abutment with a surface 490S of the substrate 490. The reader device 420 has a confocal microscope module 420CF within the housing 420H that is arranged to scan a beam of light in orthogonal directions in an x-y plane parallel to a plane defined by the rim of the housing 420HR, being a plane substantially coincident with that of the substrate 490 when the rim 420HR is in abutment therewith.

Figure 7:
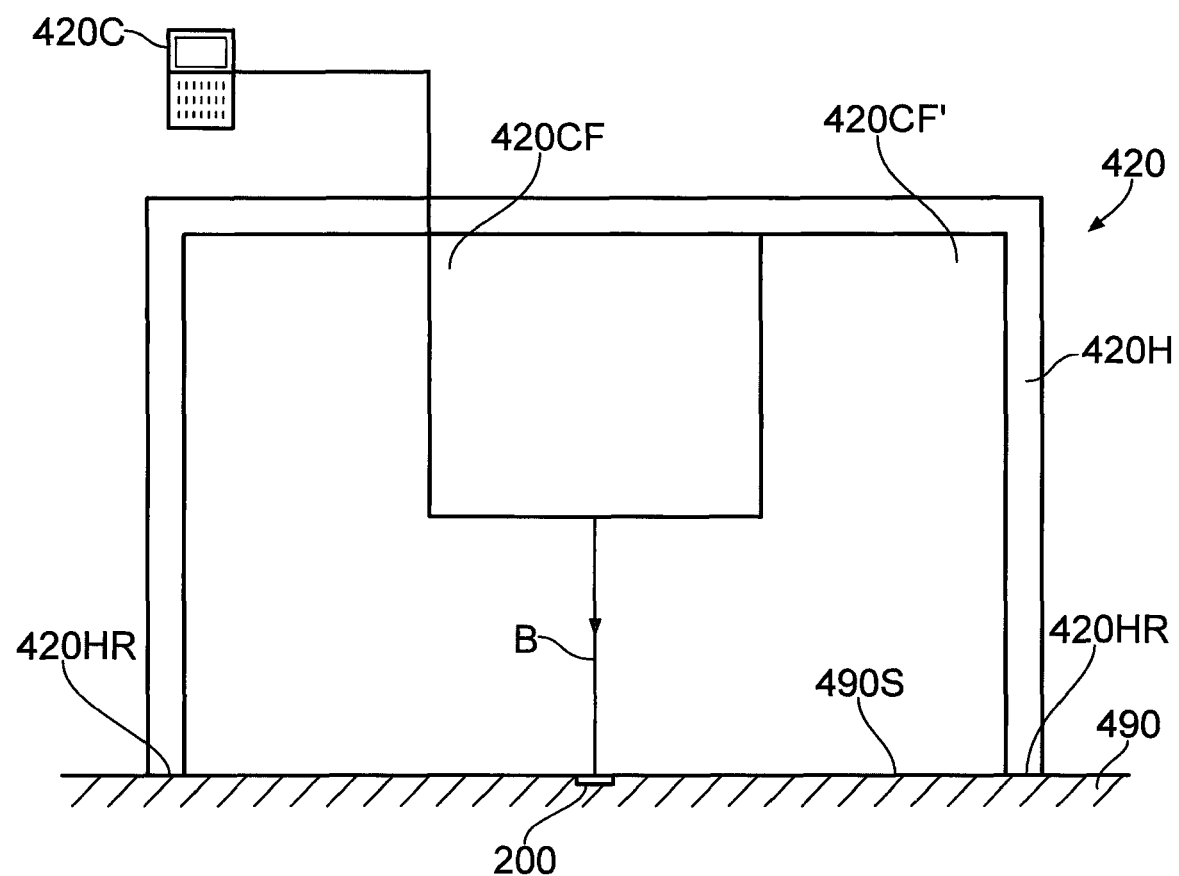
FIG. 7 is a schematic illustration of a reader device according to an embodiment of the present invention employing a confocal system.
Figure 8:
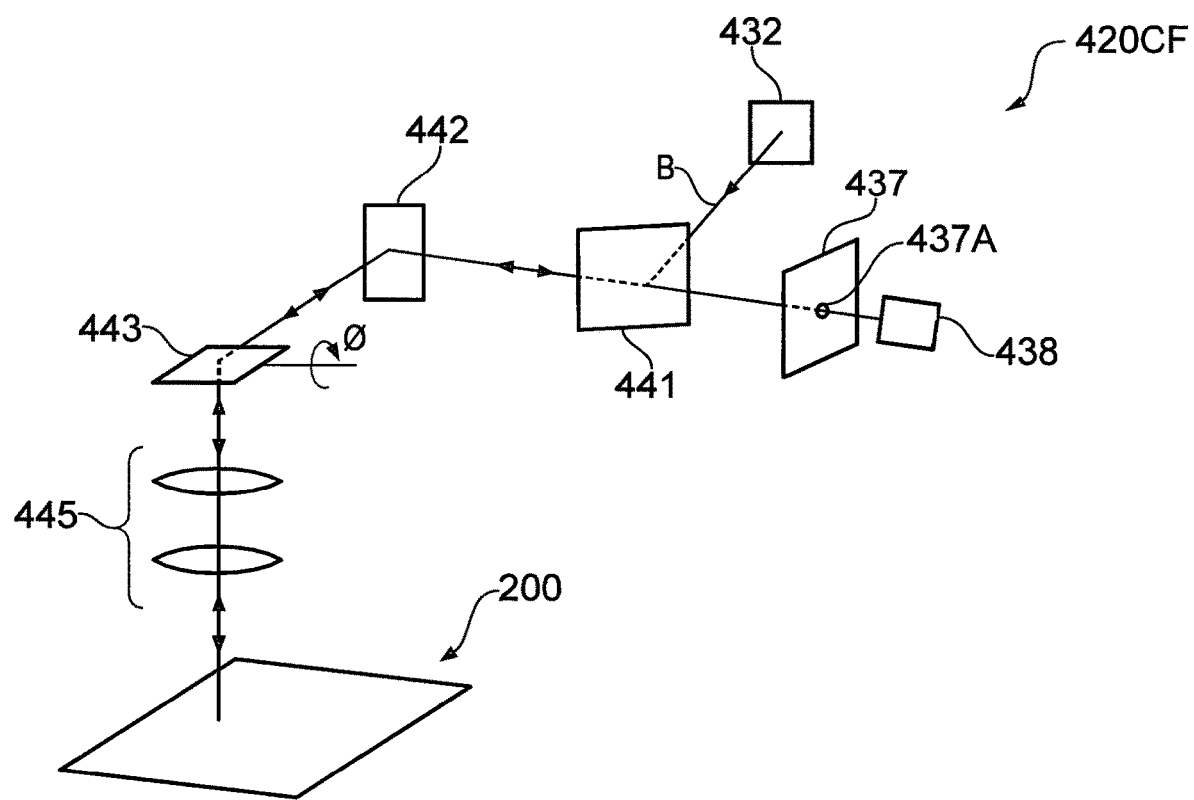
FIG. 8 is a schematic illustration of an optical arrangement of the confocal system of FIG. 7.

FIG. 8 shows schematically the optical arrangement of the confocal (or 'confocal imaging') system 420CF of FIG. 7. The system 420CF has a laser light source 432 arranged to irradiate the identification device 200 and a detector 438 arranged to detect light from the light source 432 that is reflected (scattered) back from the device 200. Focussing means in the form of a microscope lens arrangement 445 is provided within the housing, the lens arrangement 445 being configured to focus a beam of light B from the light source 432 on a relatively small area of an identification device 200 provided on or formed in the surface 490S. In the present embodiment the system 420CF is configured such that the lens arrangement 445 focusses light from the light source 432 onto the identification device 200 such that an area substantially equal to or less than that of a surface feature element is illuminated at a given moment in time. It is to be understood that the confocal system 420CF is configured to scan beam B laterally over the surface such that each of the surface feature elements of the device 200 is scanned by the beam. In the case that a device 200 has a plurality of rows of surface features elements, the beam may be scanned laterally over the device 200 row by row, or column by column, or in any suitable manner.

The laser light source 432 may be of any suitable wavelength. As in the case of the embodiments of FIG. 4 and FIG. 6 employing an interferometer, the laser may have a wavelength in the infra-red region of the electromagnetic spectrum, visible region or ultra violet (UV) region.

Light reflected by the identification device 200 passes back through the lens arrangement 445 and through an aperture 437A formed in an aperture plate 437 before being incident upon the detector 438. It is to be understood that the aperture plate 437 is configured to limit the cross-sectional area of the reflected beam incident on the detector 438 such that substantially only light reflected at the focal point reaches the detector 438. By scanning the position of the focal point of the lens arrangement 445 repeatedly over the surface of the identification device 200, at different respective depths of the focal point relative to the surface 490S (which provides a reference plane RP as described above), data in respect of the depths of the surface feature elements of the device 200 may be obtained from the distribution of light intensity over the CMOS detector device 438 in successive scans. A map of light intensity distribution over the detector device 438 following a scan at a given depth below the reference plane RP may be considered to represent an 'image' of a 'slice' of the device 200 at a given depth of the focal point below the reference plane RP. Successive scans may be considered to represent successive depth 'slices' of the device 200, since peaks in light intensity in the images captured by the detector device 438 are indicative of the presence of a surface feature element having a light reflective or scatting surface at the depth below the reference plane RP at which the slice is being recorded.

Thus, it is to be understood that, if the microscope arrangement 445 is arranged to focus light from the laser source 432 at a position that corresponds substantially to that of a surface feature element of the identification device 200 and the light scanned sequentially over the surface feature elements of the device 200, the cross-sectional area of the reflected light beam will vary as a function of the distance of a given surface feature element from the microscope arrangement 445. A relatively abrupt drop in intensity of light detected by the detector 438 may be observed as the light beam is scanned from a surface feature element at a location corresponding to the focal distance of the microscope arrangement 445 to a surface feature element of another depth, enabling the relative depths of the surface feature elements to be 'read' by the device 420.

In the embodiment of FIG. 7, three mirror elements 441, 442, 443 are provided as illustrated in FIG. 8. A first mirror element 441 is partially reflecting and reflects laser light from the source 432 to a second mirror element 442. Second mirror element is arranged to spin about a first axis and to reflect light towards third mirror element 443 which is arranged to spin about a second axis that is normal to the first axis of the second mirror element 442. The second and third mirror elements are arranged such that light passing through the lens arrangement 445 is raster scanned over the identification device 200, causing light to be incident on each surface feature element of the device 200 with the device 200 suitably positioned. Light reflected (scattered) by the device 200 passes back through the lens arrangement and is reflected by the second and third mirror elements 442, 443 to the first mirror element 441. At least some light incident on the first mirror element 441 passes substantially directly through the element 441 to the detector 43B.

It is to be understood that the reader device 420 may be provided in a portable and optionally a handheld form in order to facilitate convenient inspection of identification devices 200.

It is to be understood that in some embodiments the identification device 200 may employ a one dimensional linear array of surface feature elements, for example an array of two or more surface feature elements. In some such embodiments the reader device 420 may be required to scan a beam of light across the identification device in a single direction across the array. The reader device 420 may in addition be moved towards and away from the identification device in order to determine the depth of a surface feature element relative to a reference depth or depth of another surface feature element.

In some embodiments, a reader device according to an embodiment of the invention may be configured to scan the beam of light over a surface in order to determine the location on the surface at which an identification device is present, and to scan the beam of light over the identification device in order to 'read' the device. This feature has the advantage in some embodiments that a user is not required to align the reader device over the identification device with sub-mm accuracy, or sub-1 cm accuracy in some embodiments. It is to be understood that the accuracy with which a user must locate a reader device on a surface may vary according to the dimensions of the maximum area that the reader device may scan a beam of light over the surface.

It is to be understood that the focal point of the microscope arrangement 445 may be moved by moving the confocal system 420CF towards or away from the device 200, and/or by adjusting the focal length of the microscope arrangement 445 itself such that the focal point is moved relative to the system 420CF. This latter adjustment may be achieved in some embodiments by movement of one or both of the lenses forming part of the microscope arrangement 445 in the embodiment shown. It is to be understood that other numbers of lenses may be employed in some microscope arrangements such as more than two or less than two.

In some embodiments, the confocal system 420CF may be translated relative to the housing 420H of the reader device 420, for example by means of an electromagnetic motor drive, a piezoelectric motor drive or any other suitable means.

In some embodiments, one or more reference indicia may be provided in the vicinity of the surface feature elements in order to allow identification of a reference plane RP, relative to which the surface feature elements are provided at different respective heights or depths. The reference indicia may in some embodiments assist a reader device to locate the position and/or the orientation of an identification device on a substrate.

The portable reader device 420 is configured to output a signal to a portable computing device 420C containing the identification code 'read' by the device 420. The portable computing device then accesses a database to check whether the identification code read by the device 420 is an authorised code that was generated by an authorised entity, for example the entity that is alleged to have manufactured the object bearing the identification device 200. The computing device 420C may access a database contained within a memory thereof, such as in a data storage device such as a hard drive carried by the computing device 420C. Alternatively the computing device 420C may access a remote database such as a cloud-based database to check whether the identification code is an authorised code. In some embodiments, the computing device 420C may generate an audible sound in dependence on whether the code is an authorised code. The audible sound may be of a first type (such as a high pitched tone) or a second type (such as a low pitched tone) depending on whether the code is an authorised code or not. In some embodiments the computing device 420C may display data available from the database in respect of the object to which the identification device 200 is attached, such as object type (e.g. wristwatch model), date of manufacture, country of manufacture, and so forth. For example the identification device 200 may be in the form of an array of indentations in a rear surface of the wristwatch that is 'read' by the reader device 420, and the identification code accessed by the computing device 420C to determine authenticity as described above.

Figure 9:
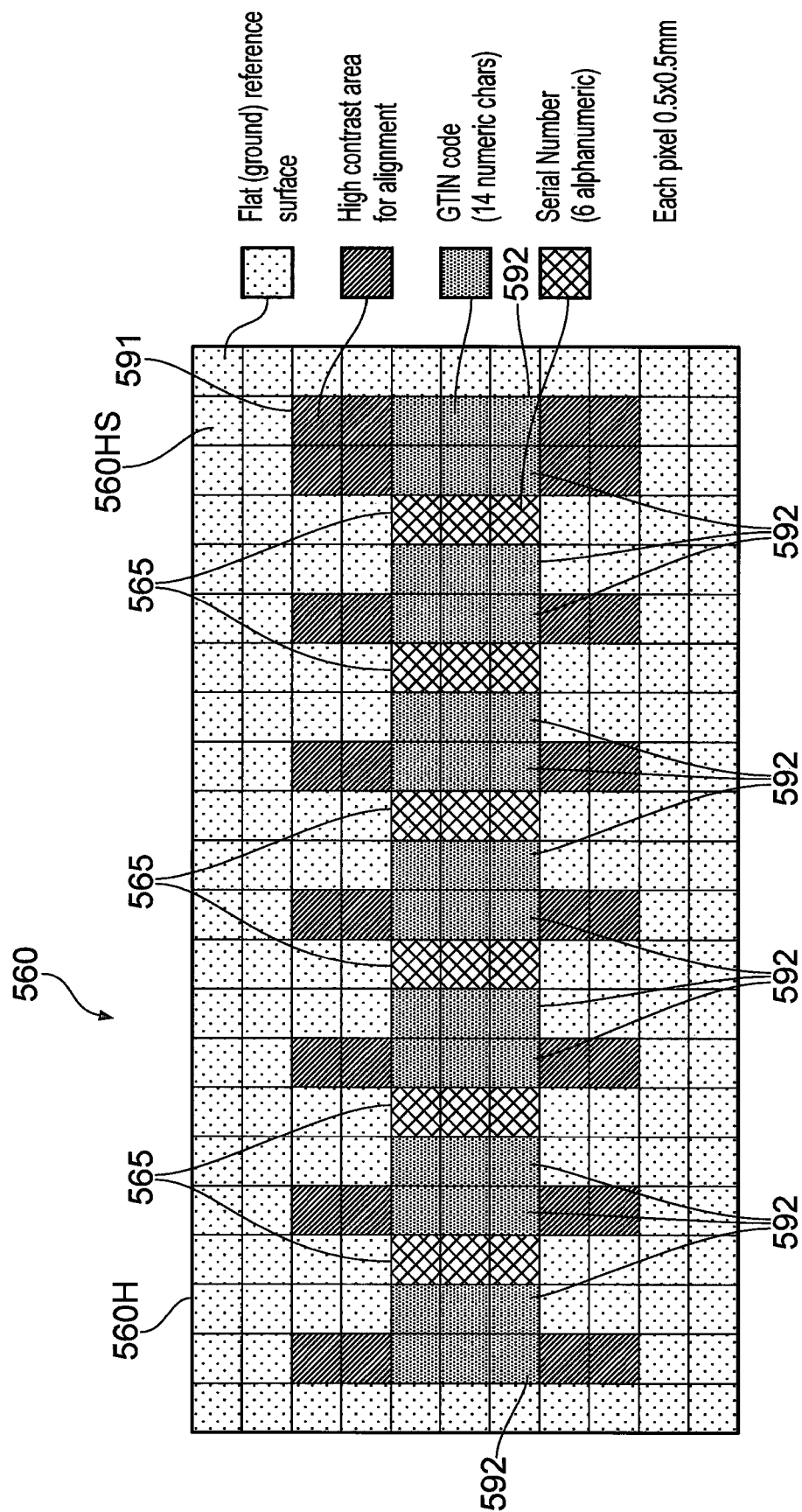
FIG. 9 is a schematic illustration of an encoding (or mould or marking) tool or device according to a further embodiment of the present invention.

FIG. 9 illustrates an encoding (or mould) tool 560 according to a further embodiment of the present invention as viewed parallel to a direction normal to the surface of a substrate in which an identification device is to be formed by the tool 560. Like features to those of the embodiment of FIG. 3 are shown with like reference signs prefixed numeral 5 instead of numeral 3.

In the embodiment of FIG. 9 the mould tool has a housing 560H having a basal surface 590HS that is arranged to contact a free surface of the substrate in which an identification device is to be formed such that the basal surface 590HS is substantially coplanar with or parallel to the free surface.

The mould tool may be considered to carry a 20×3 array of tool elements 592, 565 (i.e. three rows of 20 elements arranged in columns of 3 elements) that protrude from the basal surface 590HS by predetermined amounts, where the predetermined amount may be substantially zero for at least one tool element 592, 565 in some examples of embodiments of the invention. The tool elements 592, 565 are configured to define surface feature elements in the surface of the substrate to which the tool 560 is applied. One or more of the tool elements 592, 565 may be substantially level with the basal surface 590HS and optionally form part of the same material body as the basal surface 590HS. End surfaces of the tool elements 565 are square sided.

The 20×3 array may be considered to be composed of a 14×3 array of tool elements 592 that have substantially flat, exposed free ends 0.5 mm square (visible in FIG. 9) at substantially fixed distances from a plane defining the basal surface 590HS and a 6×3 array of tool elements provided by pin elements 565 that also have substantially flat, exposed free ends that are also 0.5 mm square but which are axially movable such that the free ends thereof may be moved to different distances from the plane defining the basal surface 590HS, in a similar manner to the pin elements 365 of the embodiment of FIG. 3. The plane defining the basal surface 590HS may be referred to as a reference plane, and the basal surface 590HS may be referred to as a reference surface.

Other dimensions of tool elements 592, 565 may be useful in some embodiments. Furthermore, one or more respective pin elements 565 may be of different size to one or more other elements 592, 565, and one or more of the respective fixed tool elements 592 may be of different size to one or more other elements 592, 565.

The 6 columns of 3 pin elements 565 may each be considered to be spaced apart from one another by two columns of 3 substantially fixed tool elements 592, end columns of pin elements 565 being spaced from end columns of the 20×3 array of tool elements 565, 592 by 2 columns of substantially fixed tool elements 592.

In some embodiments, the 14×3 array of tool elements may be configured to define a code that is substantially the same for each of the identification devices to be formed. The code may be a GTIN code corresponding to the product to which the identification device is to be applied, or any other suitable code. Other sizes of array of substantially fixed tool elements may be employed in alternative embodiments.

In contrast, in the present embodiment the 6×3 array of pin elements 365 may be employed to define a unique serial number for a particular batch of products, or individual example of product. The ability to adjust individually the distance of the free end of each pin element 365 from the plane defined by the basal surface 590HS enables a unique sequence of distances of the free surfaces of respective pin elements 365 to be established.

In the embodiment shown in FIG. 9, the basal surface is provided with a locator pattern of tool elements 591. Each tool element 591 of the locator pattern protrudes a predetermined distance out from the reference plane defined by the basal surface 590HS at locations along the length of the 20×3 array both above and below the array as viewed in FIG. 9. The purpose of the locator pattern of elements 591 is to provide a relatively conspicuous high contrast area of the identification device once formed in a surface that may be identified relatively easily by a reader device. In the embodiment shown the locator pattern has 8 columns of 2 rows of elements 591, 7 of the columns being mutually spaced apart by 2 column widths along one side of the 20×3 array, with the eighth column being immediately adjacent the seventh. Thus a single column of 2 elements is provided at one end of the row and two adjacent columns each of 2 elements are provided at the opposite end of the row. The arrangement is mirrored on both sides of the 20×3 array. It is to be understood that other arrangements may be useful in some embodiments.

This asymmetric arrangement of elements 591 with respect to a length of the tool 560 enables a reader device to determine readily the correctly orientation of a given identification device and therefore read correctly data stored by the device.

In some embodiments the tool elements 591 of a locator pattern may be arranged to protrude by a distance sufficient to produce recesses in a surface of a substrate that are readily observable to the naked eye, enabling a human operator to identify the location of an identification device on a surface of a substrate.

In some embodiments the locator pattern may be formed so as to represent a bar code or any other suitable code for recognition by a reader device.

Figure 10:
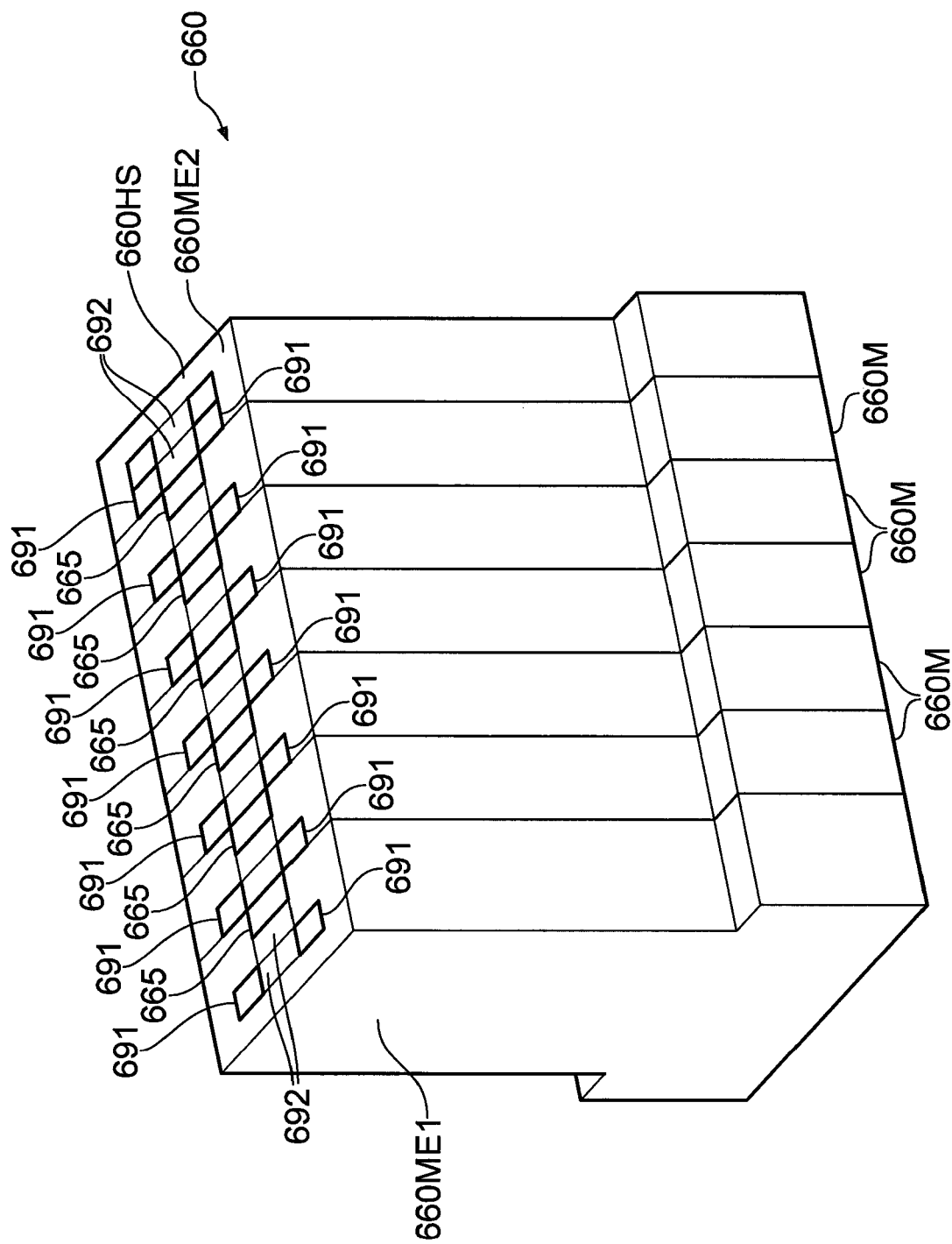
FIG. 10 is a schematic illustration of a marking tool according to a further embodiment of the present invention.

FIG. 10 is a schematic illustration of a marking tool or device 660 according to a further embodiment of the present invention. Like features of the embodiment of FIG. 10 to those of the embodiment of FIG. 9 are shown with like reference signs incremented by 100.

In the embodiment shown the tool 660 is provided with a 20×1 array (i.e. a single row) of tool elements 665, 692 that may be considered to be formed by a 6×1 array of axially movable pin elements 665 and a 14×1 array of substantially fixed tool elements 692. The respective arrays may be considered to be superimposed on one another in a similar manner to the embodiment of FIG. 9. A locator array comprising a similar pattern of tool elements 691 to that of the embodiment of FIG. 9 is also provided.

Figure 11:
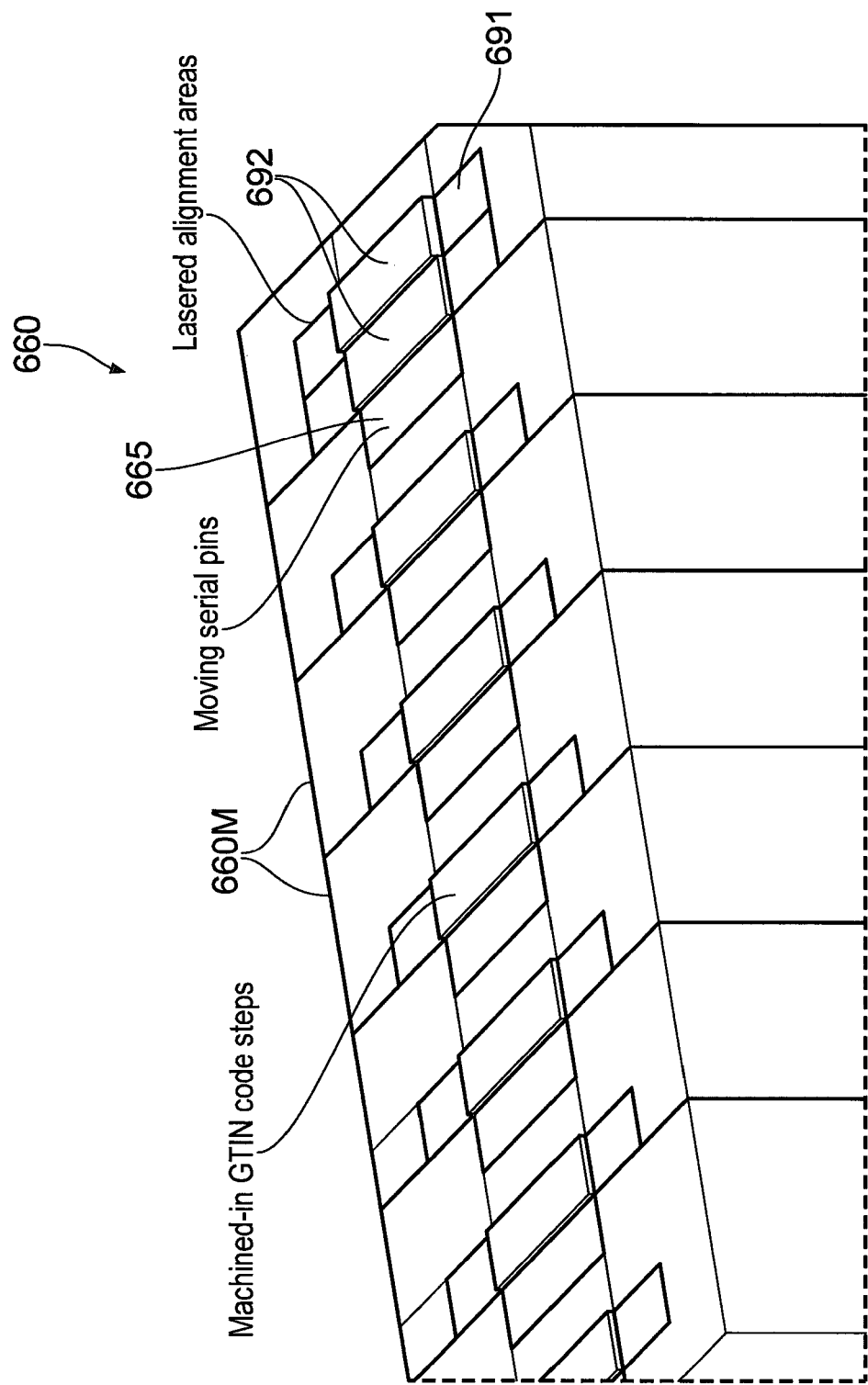
FIG. 11 is an enlarged view of the tool of the embodiment of FIG. 10.

FIG. 11 is an enlarged view of the tool 660 of the embodiment of FIG. 10. In the embodiment shown the tool elements 692 of the 14×3 array, defining a GTIN product code, are formed by machining whilst the locator pattern of elements 691 is formed by laser irradiation of the tool 560.

Figure 12:
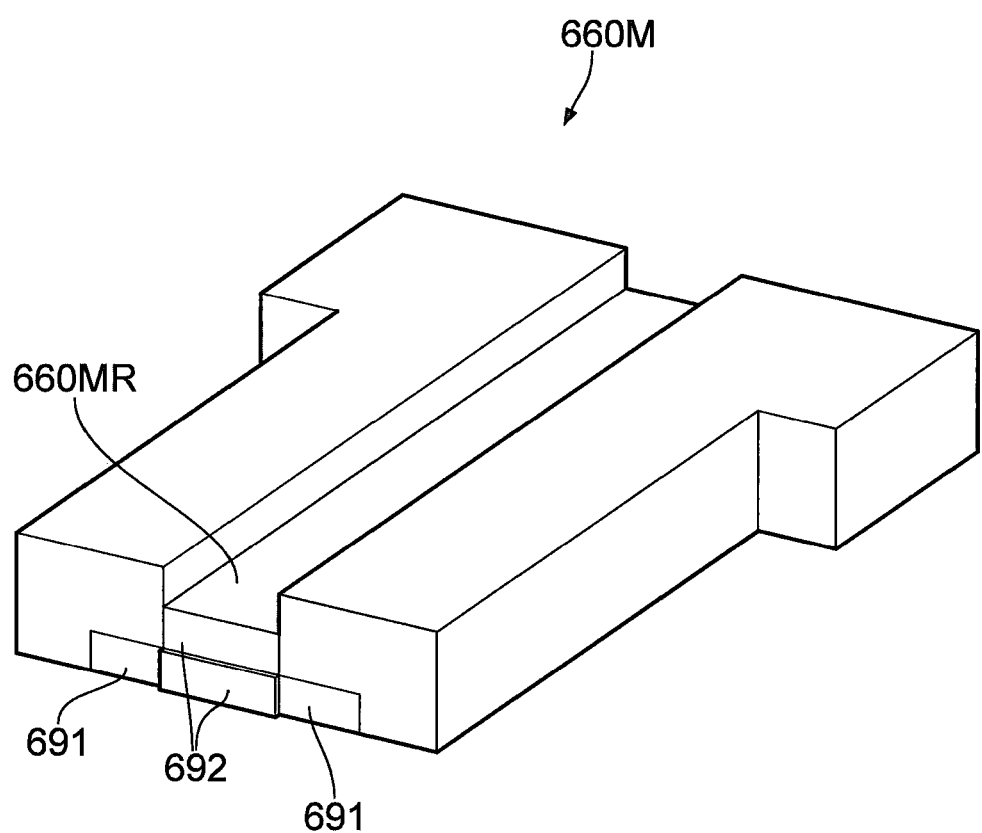
FIG. 12 is a schematic illustration of a tool module used in the embodiment of FIG. 10.

In the embodiment of FIG. 10 and FIG. 11, the tool 660 is composed of a series of five substantially identical tool modules 660M, one of which is shown in FIG. 12, and respective different end modules 660ME1, 660ME2. Each tool module 660M has a free end carrying two fixed tool elements 692 and a pair of tool elements 691 of the locator pattern on either side of one of the fixed tool elements 692. A recess 660MR along one side of the module 660M defines a channel in which a corresponding pin element 665 may be provided. The modular construction of the tool 660 allows the number of pin elements 665 to be predetermined at the stage of fabrication of the tool 660, using common modular components to form a tool of substantially any desired size. In some embodiments the modules 660M may be substantially permanently coupled to one another at the fabrication stage of a tool 660. Alternatively the modules 660M may be arranged to be disassembled for repair, replacement or to form a tool 660 of different array size, as required. The modules 660ME1, 660M, 660ME2 may be considered to be laminar modules that are laminated together to form the tool 660.

Figure 13:
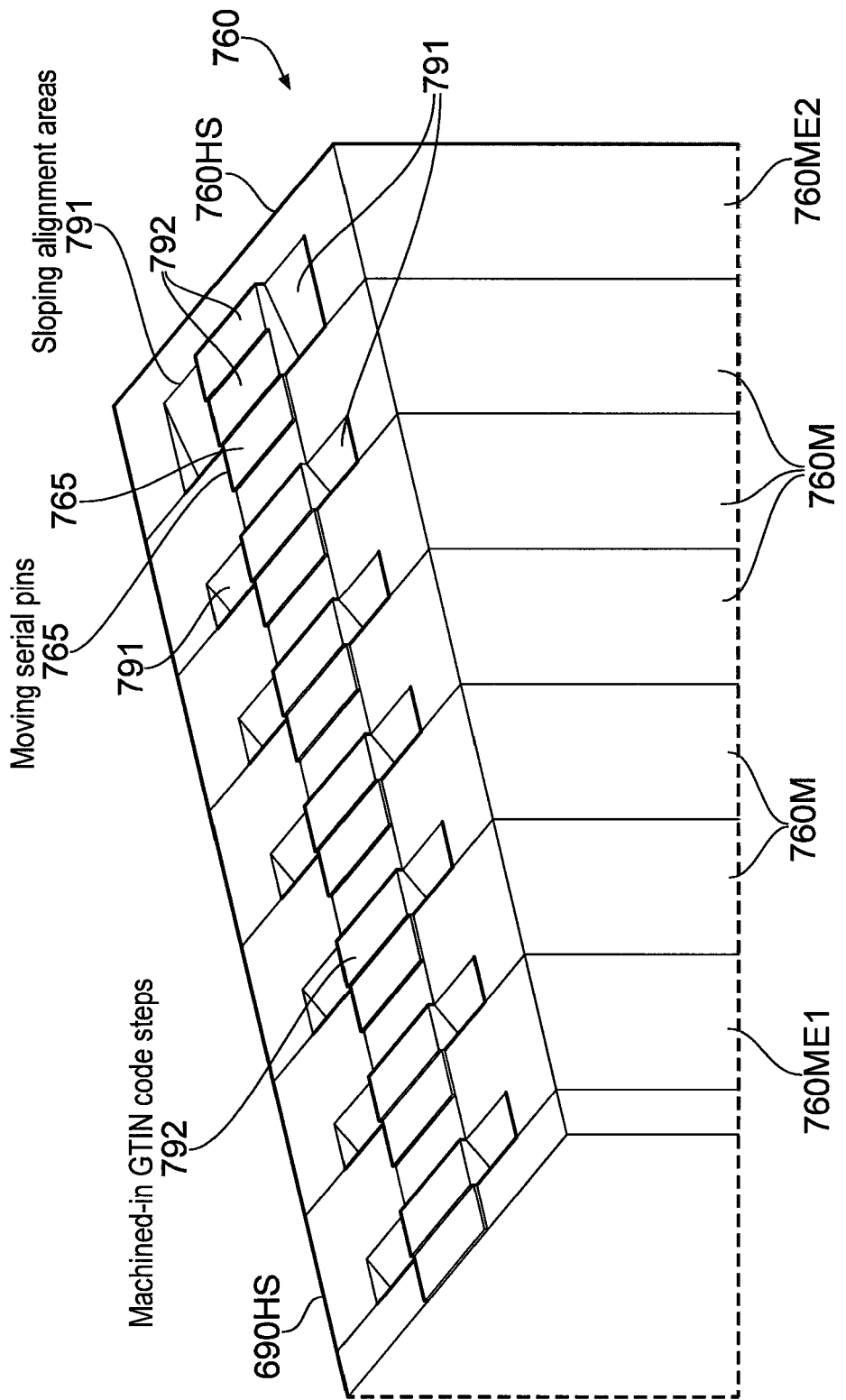
FIG. 13 is a schematic illustration of a tool according to a further embodiment of the present invention.

FIG. 13 is a schematic illustration of a tool 760 according to a further embodiment of the present invention. Like features of the embodiment of FIG. 13 to those of the embodiment of FIG. 10 are shown with like reference signs incremented by 100.

In the embodiment of FIG. 13 the tool 760 is substantially identical in construction and operation to that of the embodiment of FIG. 11 except that elements 791 forming the locator pattern of elements 791 are in the form of indentations with a free surface that is non-parallel to the reference or basal surface 760HS. Consequently, light incident on an element 791 of the locator pattern is very unlikely to be reflected back towards a light source that is incident on the element 791 along a direction that is substantially normal to the basal (or reference) surface 760HS. Thus, optical contrast between elements 791 of the locator pattern and the reference or basal surface 760HS may be enhanced.

As noted above, in some embodiments a marking tool may be provided that employs microactuators in the form or piezoelectric devices instead of thermal expansion elements. Such devices are capable of maintaining the respective pin element to which each is coupled in a substantially fixed position with substantially no power required to maintain the actuator in the fixed position even when subjected to the pressures found in typical injection moulding applications. In some embodiments, electrical energy may be supplied to one or more piezoelectric devices in order to maintain the device in the required position when required, as described above. The amount of electrical energy may be adjusted in dependence on the pressure of material in a mould tool in which the marking tool is provided in embodiments in which the marking tool is provided in a mould tool.

In some embodiments, an ultrasonic heating technique may be employed in order to form an identification device in a substrate surface. For example, a marking tool such as the tool 660 of FIG. 10 may be caused to vibrate at a frequency and amplitude sufficiently high to cause local melting of the substrate to which the device is being applied. The tool 660 may be caused to vibrate and be urged towards the surface in order to form an identification device in the surface. The tool 660 may be caused to vibrate at an ultrasonic frequency in contact with the substrate surface in order to cause local melting.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A marking device for forming an identification device in the form of a surface feature device in a surface, the identification device comprising indentations in a surface, the marking device comprising:
  a plurality of fixed marking elements; and
  an array of movable marking elements each configured to assume one of a plurality of predetermined positions by at least one actuator comprised by the device under the control of a controller, wherein in each predetermined position each respective movable marking element protrudes a respective different predetermined distance from a common reference plane, the device being configured to at least partially embed the movable marking elements in a surface of an article to form indentations of different respective depths therein, the respective depths corresponding to the predetermined distances from the common reference plane that the movable marking elements protrude.

2. The device according to claim 1, wherein the movable marking elements are arranged to define a regular array of elements, wherein the array of elements is less than 1 cm square.

3. The device according to claim 1, wherein the movable marking elements are arranged to define a regular array of elements, wherein the array of elements is less than 0.1 cm square.

4. The device according to claim 1, wherein a plurality of the movable marking elements are spaced apart from one another by at least one of the fixed marking elements.

5. The device according to claim 1, further configured to at least partially embed the fixed marking elements and the movable marking elements in a surface of an article to form indentations of different respective depths therein wherein the fixed marking elements are arranged to define an identification code.

6. The device according to claim 1, further configured to cause local softening of a surface in contact therewith.

7. The device according to claim 1, further configured to be provided in a wall of a mould tool defining a mould cavity, wherein indentations of the different respective depths may be formed in a moulded article formed by the mould tool.

8. A mould tool defining a mould cavity, the mould tool comprising a marking device according to claim 7, wherein the marking device is arranged to form an identification device in a surface of an article formed in the mould cavity.

9. The mould tool according to claim 8 in combination with a controller, the controller being configured to receive a pressure signal indicative of a pressure within the mould cavity, the controller being configured to cause the plurality of actuators to apply force to the respective movable marking elements, the amount of force depending at least in part on the pressure signal.

10. The mould tool according to claim 9, wherein the amount of force is arranged to increase with increasing pressure within the mould cavity.

* * * * *